US011330490B2

(12) United States Patent
Shiga et al.

(10) Patent No.: US 11,330,490 B2
(45) Date of Patent: May 10, 2022

(54) VEHICLE COMMUNICATION SYSTEM, BASE STATION, SERVER APPARATUS, MESSAGE TRANSMITTING METHOD, VEHICLE RELATED SERVICE PROVIDING METHOD, AND READABLE MEDIUM

(71) Applicant: NEC Corporation, Tokyo (JP)

(72) Inventors: Shingo Shiga, Tokyo (JP); Shinji Onishi, Tokyo (JP); Daisuke Mizukami, Tokyo (JP); Kazuhiro Egashira, Tokyo (JP); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/916,844

(22) Filed: Jun. 30, 2020

(65) Prior Publication Data

US 2020/0329412 A1 Oct. 15, 2020

Related U.S. Application Data

(63) Continuation of application No. 16/247,974, filed on Jan. 15, 2019, now Pat. No. 10,959,145, which is a
(Continued)

(30) Foreign Application Priority Data

Mar. 20, 2015 (JP) .............................. JP2015-058152

(51) Int. Cl.
*H04W 36/08* (2009.01)
*H04W 4/48* (2018.01)
(Continued)

(52) U.S. Cl.
CPC .............. *H04W 36/08* (2013.01); *G08G 1/09* (2013.01); *G08G 1/096716* (2013.01);
(Continued)

(58) Field of Classification Search
CPC ...... G08G 1/01–0145; G08G 1/0967–096791; H04L 67/12; H04W 4/02–029; H04W 4/40–48
See application file for complete search history.

(56) References Cited

U.S. PATENT DOCUMENTS 9,293,042 B1 * 3/2016 Wasserman .............. G08G 1/09
9,783,159 B1 * 10/2017 Potter ..................... G08B 21/02
(Continued)

FOREIGN PATENT DOCUMENTS

EP 0987910 A2 3/2000
EP 2 247 128 A1 11/2010
(Continued)

OTHER PUBLICATIONS

Japanese Notice of Reasons for Refusal issued in Japanese Patent Application No. 2020-018070, dated Nov. 4, 2020, 7 pages.
(Continued)

*Primary Examiner* — Pao Sinkantarakorn

(57) ABSTRACT

An object of the present invention is to provide a vehicle communication system which distributes information which is necessary in vehicle units. A vehicle communication system according to the present invention includes: a vehicle base station which performs wireless communication with a vehicle terminal installed in a vehicle to receive vehicle related service; and a server apparatus which specifies the vehicle base station of a message distribution destination according to the vehicle related service to be provided, and distributes a message related to the vehicle related service to be provided, to the specified vehicle base station. When receiving the message transmitted from the server apparatus, the vehicle base station transmits the message to the vehicle terminal which subscribes to the vehicle related service related to the message, from a plurality of vehicle terminals
(Continued)

and located in a communication area formed by the vehicle base station.

16 Claims, 19 Drawing Sheets

Related U.S. Application Data continuation of application No. 15/559,751, filed as application No. PCT/JP2016/001487 on Mar. 15, 2016, now abandoned.

(51) Int. Cl.

| | | |
|---|---|---|
| *H04W 4/44* | (2018.01) | |
| *G08G 1/09* | (2006.01) | |
| *G08G 1/0967* | (2006.01) | |
| *H04W 4/02* | (2018.01) | |
| *H04W 4/06* | (2009.01) | |
| *H04W 88/00* | (2009.01) | |
| *H04W 84/06* | (2009.01) | |
| *H04L 67/12* | (2022.01) | |
| *H04W 92/20* | (2009.01) | |

(52) U.S. Cl.
CPC . *G08G 1/096741* (2013.01); *G08G 1/096775* (2013.01); *H04L 67/12* (2013.01); *H04W 4/02* (2013.01); *H04W 4/06* (2013.01); *H04W 4/44* (2018.02); *H04W 4/48* (2018.02); *H04W 84/06* (2013.01); *H04W 88/00* (2013.01); *H04W 92/20* (2013.01)

(56) References Cited

U.S. PATENT DOCUMENTS

| | | |
|---|---|---|
| 2007/0275717 A1 | 11/2007 | Edge et al. |
| 2008/0081641 A1 | 4/2008 | Smith et al. |
| 2008/0172475 A1 | 7/2008 | Okamura |
| 2009/0209233 A1 | 8/2009 | Morrison |
| 2011/0010443 A1* | 1/2011 | Nagatomo ............ G08G 1/0962 709/223 |
| 2011/0261785 A1 | 10/2011 | Kwon et al. |
| 2012/0315874 A1 | 12/2012 | Li et al. |
| 2014/0213238 A1 | 7/2014 | Giraud et al. |
| 2015/0103743 A1 | 4/2015 | Tamura et al. |
| 2016/0255554 A1 | 9/2016 | Ke et al. |
| 2017/0201849 A1 | 7/2017 | Chandramouli |
| 2017/0245310 A1* | 8/2017 | Chandramouli ...... H04W 76/10 |

FOREIGN PATENT DOCUMENTS

| | | |
|---|---|---|
| JP | H11-065434 A | 3/1999 |
| JP | 2001-357007 A | 12/2001 |
| JP | 2002-261685 A | 9/2002 |
| JP | 2004-240761 A | 8/2004 |
| JP | 2005-332371 A | 12/2005 |
| JP | 2009-168772 A | 7/2009 |
| JP | 2009-200842 A | 9/2009 |
| JP | 2013-516887 A | 5/2013 |
| WO | WO-2013/179542 A1 | 12/2013 |
| WO | 2014/173429 A1 | 10/2014 |
| WO | WO-2015-001795 A1 | 1/2015 |

OTHER PUBLICATIONS

3GPP 3rd Generation Partnership Project; Technical Specification Group Core Network and Terminals; Non-Access-Stratum (NAS) protocol for Evolved Packet System (EPS); Stage 3 (Release 13); 3GPP TS 24.301 V13.0.0 (Dec. 2014), pp. 1-373 (373 pages).
3GPP TR 22.7de V0.1.0 (Feb. 2015); 3rd Generation Partnership Project; Technical Specification Group Services and System Aspects; Study on LTE Support for V2X Services (Release 14), (18 pages).
Extended European Search Report issued by the European Patent Office for European Application No. 16768004.0 dated Nov. 14, 2018 (12 pages).
International Search Report corresponding to PCT/JP2016/001487, dated Jun. 14, 2016 (3 pages).
Japanese Notice of Reasons for Refusal issued in Japanese Patent Application No. 2017-507479, dated Dec. 10, 2019, 6 pages.
Japanese Office Action for JP Application No. 2021-077002 dated Mar. 15, 2022 with English Translation.

* cited by examiner

| VEHICLE TERMINAL ID | GEOGRAPHY INFORMATION | IP ADDRESS | SUBSCRIBED SERVICE INFORMATION |
| --- | --- | --- | --- |
| A | eNB#A | IP address #A | Service#B, Service#C |
| B | eNB#B | IP address #B | Disable |
| C | eNB#A | IP address #C | Service#C |
| D | eNB#C | IP address #D | Service#A, Service#B |

Fig. 12

VEHICLE COMMUNICATION SYSTEM, BASE STATION, SERVER APPARATUS, MESSAGE TRANSMITTING METHOD, VEHICLE RELATED SERVICE PROVIDING METHOD, AND READABLE MEDIUM

CROSS-REFERENCE TO RELATED APPLICATIONS

This application is a continuation patent application of U.S. patent application Ser. No. 16/247,974, entitled "VEHICLE COMMUNICATION SYSTEM, BASE STATION, SERVER APPARATUS, MESSAGE TRANSMITTING METHOD, VEHICLE RELATED SERVICE PROVIDING METHOD, AND READABLE MEDIUM," filed Jan. 15, 2019, which is a continuation patent application of U.S. patent application Ser. No. 15/559,751, entitled "VEHICLE COMMUNICATION SYSTEM, BASE STATION, SERVER APPARATUS, MESSAGE TRANSMITTING METHOD, VEHICLE RELATED SERVICE PROVIDING METHOD, AND READABLE MEDIUM," filed Sep. 19, 2017 and now abandoned, which is a U.S. national stage application of International Application No. PCT/JP2016/001487 entitled "VEHICLE COMMUNICATION SYSTEM, BASE STATION, SERVER APPARATUS, MESSAGE TRANSMITTING METHOD, VEHICLE RELATED SERVICE PROVIDING METHOD, AND READABLE MEDIUM," filed on Mar. 15, 2016, which claims priority to Japanese Patent Application No. 2015-058152, filed on Mar. 20, 2015, the disclosures of each of which are hereby incorporated by reference in their entirety.

TECHNICAL FIELD

The present invention relates to a vehicle communication system, a base station, a server apparatus, a message transmitting method, a vehicle related service providing method and a program. More particularly, the present invention relates to the vehicle communication system, the base station, the server apparatus, the message transmitting method, the vehicle related service providing method and the program which transmit messages to, for example, a plurality of vehicle terminals.

BACKGROUND ART

In recent years, many users have been performing mobile communication by using smartphones and tablet terminals. In future, it is predicted that various devices such as sensors and machines will connect to a mobile network in order to perform mobile communication. As a service provided by using sensors and machines, a service related to vehicles such as vehicle automatic driving, high-tech driving assistance and broadcast distribution of traffic information has been studied. Accommodation of vehicles in a mobile network has been studied to execute the vehicle related service.

Non Patent Literature 1 discloses request conditions and a network configuration for accommodating vehicles in a mobile network.

CITATION LIST

Non Patent Literature

NPL 1: 3GPP TR22.7de V0.1.0 (2015-02) S1-150286

SUMMARY OF INVENTION

Technical Problem

It is assumed that CBS (Cell Broadcast Service) defined by current 3GPP (3rd Generation Partnership Project) distributes information for performing automatic driving and high-tech driving assistance and traffic information to each vehicle. In this regard, for a vehicle related service, it is necessary to distribute information which is necessary in vehicle units according to a service type or subscription information. However, the CBS is a service for broadcasting a message from a mobile network to all communication terminals in a specific area. Therefore, there is a problem that, when vehicle related service is provided by using the CBS, it is not possible to distribute information which is necessary in vehicle units.

An object of the present invention is to provide a vehicle communication system, a base station, a server apparatus, a message transmitting method, a vehicle related service providing method and a program which distribute information which is necessary in vehicle units.

Solution to Problem

A vehicle communication system according to a first aspect of the present invention includes: a vehicle base station that performs wireless communication with a vehicle terminal installed in a vehicle to receive a vehicle related service; and a server apparatus that specifies the vehicle base station of a message distribution destination according to a vehicle related service to be provided, and distributes a message related to the vehicle related service to be provided, to the specified vehicle base station, and, upon receiving the message transmitted from the server apparatus, the vehicle base station transmits the message to a vehicle terminal of a plurality of the vehicle terminals, wherein the vehicle terminal subscribes to the vehicle related service related to the message and the plurality of vehicle terminals are located in a communication area formed by the vehicle base station.

A base station according to a second aspect of the present invention includes: a deciding unit that specifies a vehicle base station of a message distribution destination according to a vehicle related service to be provided, and, upon receiving a message from a server apparatus, decides a vehicle terminal of a plurality of the vehicle terminals, wherein the server apparatus distributes the message related to the vehicle related service to be provided to the specified vehicle base station, the vehicle terminal is installed in a vehicle to receive the vehicle related service and subscribes to the vehicle related service related to the message, and the plurality of vehicle terminals are located in a communication area formed by the base station; and a communication unit that transmits the message to the vehicle terminal that subscribes to the vehicle related service related to the message.

A server apparatus according to a third aspect of the present invention includes: a distribution destination determining unit that determines a vehicle base station of a message distribution destination according to a vehicle related to service to be provided, from a plurality of vehicle base stations that perform wireless communication with a vehicle terminal installed in a vehicle to receive the vehicle related service; and the server apparatus that distributes a message related to the vehicle related service to be provided, to the determined vehicle base station.

A message transmitting method according to a fourth aspect of the present invention includes: specifying a vehicle base station of a message distribution destination according to a vehicle related service to be provided, and receiving a message from a server apparatus that distributes the message related to the vehicle related service to be provided, to the specified vehicle base station; deciding a vehicle terminal of a plurality of the vehicle terminals, wherein the vehicle terminal is installed in a vehicle to receive the vehicle related service and subscribes to the vehicle related service related to the message, and the plurality of the vehicle terminals are located in a communication area formed by the vehicle base station; and transmitting the message to the vehicle terminal that subscribes to the vehicle related service related to the message.

A vehicle related service providing method according to a fifth aspect of the present invention includes: determining a vehicle base station of a message distribution destination according to a vehicle related service to be provided, from a plurality of the vehicle base stations that perform wireless communication with a vehicle terminal installed in a vehicle to receive the vehicle related service; and distributing a message related to the vehicle related service to be provided, to the determined vehicle base station.

A program according to a sixth aspect of the present invention causes a computer to execute: specifying a vehicle base station of a message distribution destination according to a vehicle related service to be provided, and receiving a message from a server apparatus that distributes the message related to the vehicle related service to be provided, to the specified vehicle base station; deciding a vehicle terminal of a plurality of the vehicle terminals, wherein the vehicle terminal is installed in a vehicle to receive the vehicle related service and subscribes to the vehicle related service related to the message, and the plurality of vehicle terminals are located in a communication area formed by the vehicle base station; and transmitting the message to the vehicle terminal that subscribes to the vehicle related service related to the message.

Advantageous Effects of Invention

According to the present invention, it is possible to provide a vehicle communication system, a base station, a server apparatus, a message transmitting method, a vehicle related service providing method and a program which distribute information which is necessary in vehicle units.

BRIEF DESCRIPTION OF DRAWINGS

FIG. 12 is a view for explaining a management table according to the second embodiment.

DESCRIPTION OF EMBODIMENTS

First Embodiment

Figure 1:
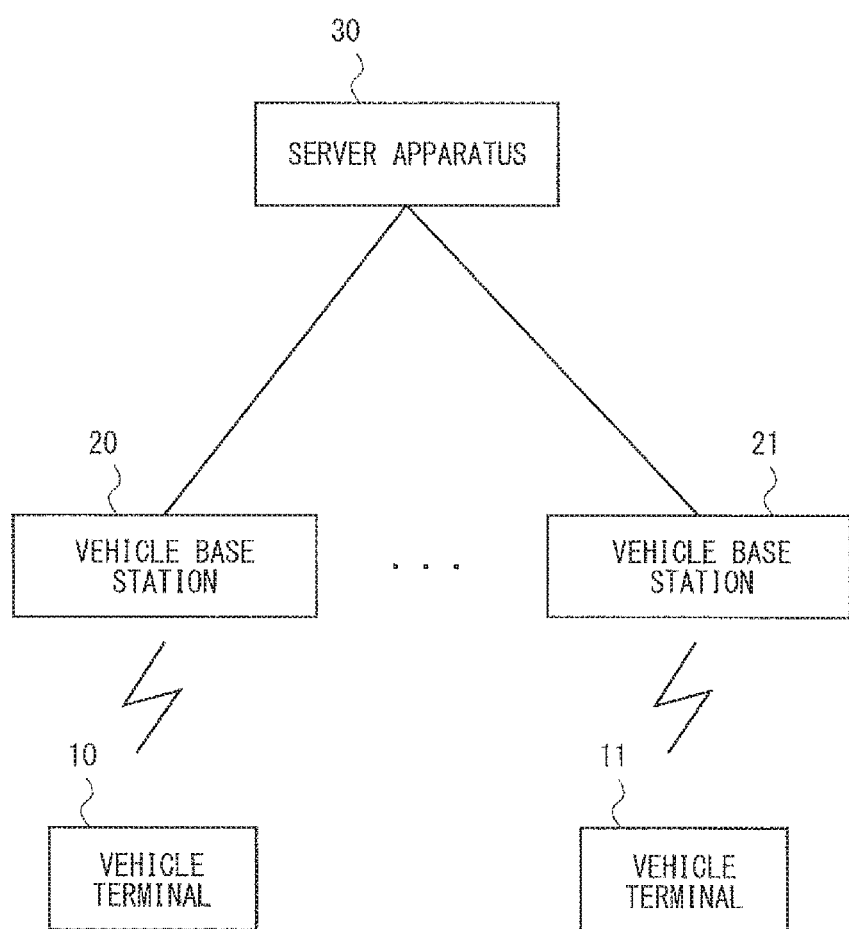
FIG. 1 is a configuration diagram of a vehicle communication system according to a first embodiment.

Embodiments of the present invention will be described below with reference to the drawings. A configuration example of a vehicle communication system according to the first embodiment of the present invention will be described with reference to FIG. 1. A vehicle communication system includes a vehicle terminal 10, a vehicle terminal 11, a vehicle base station 20, a vehicle base station 21 and a server apparatus 30. The vehicle terminal 10, the vehicle terminal 11, the vehicle base station 20, the vehicle base station 21 and the server apparatus 30 may be computer apparatuses which operate when processors execute programs stored in memories.

The vehicle terminal 10 and the vehicle terminal 11 are, for example, communication terminals which are installed or mounted in vehicles. The vehicle terminal 10 and the vehicle terminal 11 are used to receive a vehicle related service. The vehicle related service may include, for example, vehicle automatic driving, high-tech driving assistance and traffic information broadcast distribution.

The vehicle base station 20 and the vehicle base station 21 are base stations which perform wireless communication with the vehicle terminal 10 and the vehicle terminal 11. The vehicle base station 20 and the vehicle base station 21 may be base stations which perform wireless communication only with vehicle terminals, or may be base stations which perform wireless communication with vehicle terminals and, in addition, mobile telephone terminals and smartphone terminals.

The vehicle base station 20 and the vehicle base station 21 may perform wireless communication with the vehicle terminal 10 and the vehicle terminal 11 by using, for example, LTE (Long Term Evolution) defined as a wireless communication method according to 3GPP.

The server apparatus 30 specifies a message distribution destination vehicle base station and a vehicle terminal according to a vehicle related service to be provided. Further, the server apparatus 30 distributes a message related to the vehicle related service to be provided, to the specified vehicle base station. The server apparatus 30 may specify a vehicle base station to which a message is distributed when, for example, providing vehicle automatic driving. The specified vehicle base station may be different from the vehicle base station to which the message is distributed when providing high-tech driving assistance.

Alternatively, the server apparatus 30 may change the vehicle base station to which the message is distributed, according to contents of traffic information to be distributed. The message related to the vehicle related service may be, for example, traffic information which is distributed to a vehicle terminal or a message indicating vehicle operation contents.

Upon receiving the message from the server apparatus 30, the vehicle base station 20 or the vehicle base station 21 transmits the message to a vehicle terminal which subscribes to the vehicle related service related to the message among a plurality of vehicle terminals located in a communication area formed by vehicle base station 20 or the vehicle base station 21. That is, the vehicle base station 20 does not broadcast the message transmitted from the server apparatus 30 to a plurality of vehicle terminals located in the communication area formed by the vehicle base station 20. Instead, it transmits the message only to the vehicle terminal which subscribes to the vehicle related service. Information regarding whether or not each vehicle terminal subscribes to the vehicle related service, in other words, information which is transmitted and related to each vehicle terminal may be included in the message distributed from the server apparatus 30 or may be held in the vehicle base station 20.

As described above, in the vehicle communication system according to the first embodiment of the present invention, the vehicle base station 20 and the vehicle base station 21 can transmit messages only to vehicle terminals which subscribe to a vehicle related service related to the message transmitted from the server apparatus 30 among a plurality of vehicle terminals located in the communication areas formed by the vehicle base station 20 and the vehicle base station 21. Further, the vehicle terminal 10 and the vehicle terminal 11 can receive information related to a subscribed service among pieces of information distributed from the server apparatus 30. Consequently, the vehicle terminal 10 and the vehicle terminal 11 stop receiving information whose reception is not desired. Consequently, it is possible to reduce a processing burden on the vehicle terminal 10 and the vehicle terminal 11, and further suppress an increase in battery consumption of the vehicle terminal 10 and the vehicle terminal 11.

Second Embodiment

Subsequently, a configuration example of a vehicle communication system according to the second embodiment of the present invention will be described with reference to FIG. 2. The vehicle communication system in FIG. 2 includes vehicle terminals 40, a device terminal 50, V2X (Vehicle to X: X represents a vehicle, a pedestrian or a server apparatus) eNBs (evolved NodeB) 61, an eNB 62, a MME (Mobility Management Entity) 63, a HSS (Home Subscriber Server) 64, a SCEF (Service Capability Exposure Function) 65, a GW (Gateway) 67, a PDN (Packet Data Network) 68 and V2X APL (Application) server apparatuses 69.

The vehicle terminals 40 correspond to a vehicle terminal 10 and a vehicle terminal 11 in FIG. 1. The device terminal 50 may be, for example, a mobile telephone terminal or a smartphone terminal. Further, the device terminal 50 may be a terminal which does not receive a vehicle related service. Furthermore, the vehicle related service may be referred to as a V2X service.

The V2X eNBs 61 correspond to a vehicle base station 20 and a vehicle base station 21 in FIG. 1. The V2X eNBs 61 perform wireless communication with the vehicle terminals 40 by using LTE. Further, the V2X eNBs 61 may perform wireless communication with the device terminal 50 in addition to the vehicle terminals 40 by using LTE. The device terminal 50 performs wireless communication with the eNB 62 by using LTE.

The MME 63 is a node apparatus which controls call processing related to the vehicle terminals 40 and the device terminal 50. More specifically, the MME 63 sets a communication route when the vehicle terminals 40 and the device terminals 50 communicate with each other. Further, the MME 63 obtains subscriber information of the vehicle terminals 40 and the device terminal 50 stored in the HSS 64, and performs call processing by using the subscriber information. Furthermore, data used to control the call processing by the MME 63 may be referred to as control data or C (Control)-Plane data. The HSS 64 manages subscriber data related to a plurality of UEs including the vehicle terminals 40 and the device terminal 50.

The V2X APL server apparatuses 69 correspond to a server apparatus 30 in FIG. 1. The V2X APL server apparatuses 69 provide a V2X service to the vehicle terminals 40. The SCEF 65 is an apparatus which controls communication between a mobile network and the V2X APL server apparatuses 69. More specifically, the SCEF 65 may be an apparatus which executes processing for authenticating the V2X APL server apparatuses 69 when the V2X APL server apparatuses 69 and the like managed by a business operator different from a telecommunications carrier which manages the mobile network execute V2X service. The mobile network may be, for example, a network configured by the V2X eNBs 61, the eNB 62, the MME 63, the HSS 64, the SCEF 65 and the GW 67.

The GW 67 is a gateway apparatus which relays user data transmitted between the V2X APL server apparatus 69 and the V2X eNBs 61. Alternatively, the GW 67 is the gateway apparatus which relays user data transmitted and received between the eNB 62 and the PDN 68. The user data may be referred to as U (User)-Plane data. Further, the GW 67 may be an S (Serving)-GW and a P (PDN)-GW which are defined as apparatuses which relay user data by 3GPP. Alternatively, the GW 67 may be a LGW (Local Gateway) which offloads user data in the mobile network. The GW 67 which operates as the LGW transmits user data transmitted by the V2X eNBs 61, to the V2X APL server apparatuses 69 without relaying the user data via the S-GW and the P-GW. Further, the GW 67 which operates as the LGW transmits the user data transmitted from the V2X APL server apparatuses 69, to the V2X eNBs 61 without relaying the user data via the S-GW and the P-GW. Furthermore, the V2X APL server apparatuses 69 may be connected with the Internet and provide Internet connection for the vehicle terminals 40 and the device terminal 50.

The PDN 68 is an external network connected with the GW 67. The external network may be, for example, a network which is managed by a business operator different from the telecommunications carrier which manages the mobile network, or the Internet.

Subsequently, service modes which use the V2X APL server apparatuses 69 according to the second embodiment of the present invention will be described with reference to FIGS. 3 to 6. In this regard, FIGS. 3 to 6 illustrate configurations simplified compared to a configuration in FIG. 2.

Figure 3:
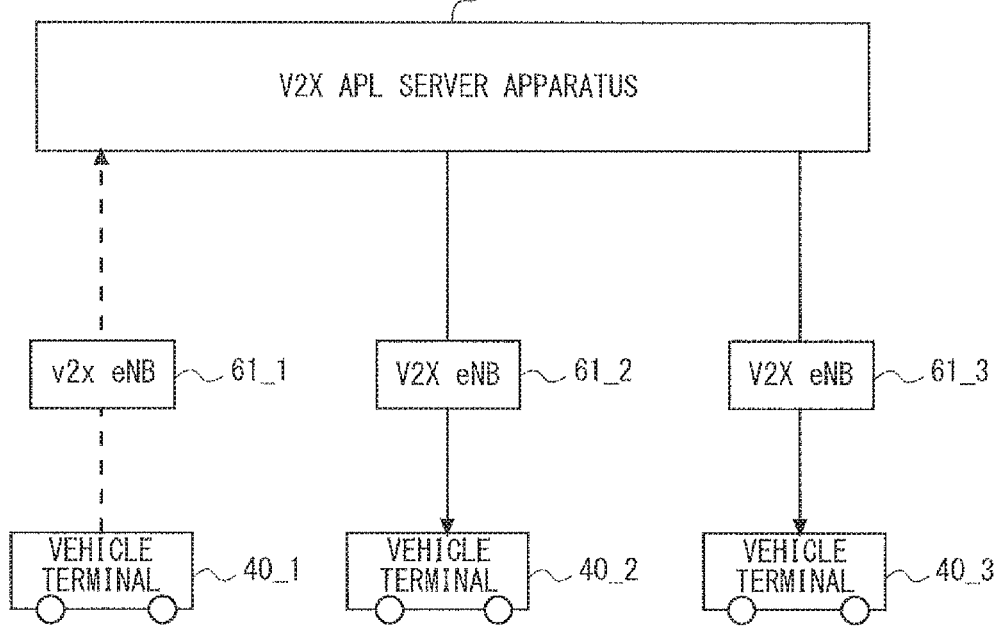
FIG. 3 is a view for explaining a service mode which uses a V2X APL server apparatus according to the second embodiment.

FIG. 3 illustrates service for distributing information to a vehicle terminal 40_2 and a vehicle terminal 40_3 in response to an information distribution request from a vehicle terminal 40_1 or an event which has occurred in the vehicle terminal 40_1. When, for example, detecting occurrence of an accident nearby, the vehicle terminal 40_1 may transmit information indicating the occurrence of the accident to the V2X APL server apparatuses 69. When receiving the information indicating the occurrence of the accident from the vehicle terminal 40_1, the V2X APL server apparatuses 69 may broadcast an area in which the accident has occurred to the vehicle terminal 40_2 and the vehicle terminal 40_3 which are driving near the accident occurrence area.

Figure 4:
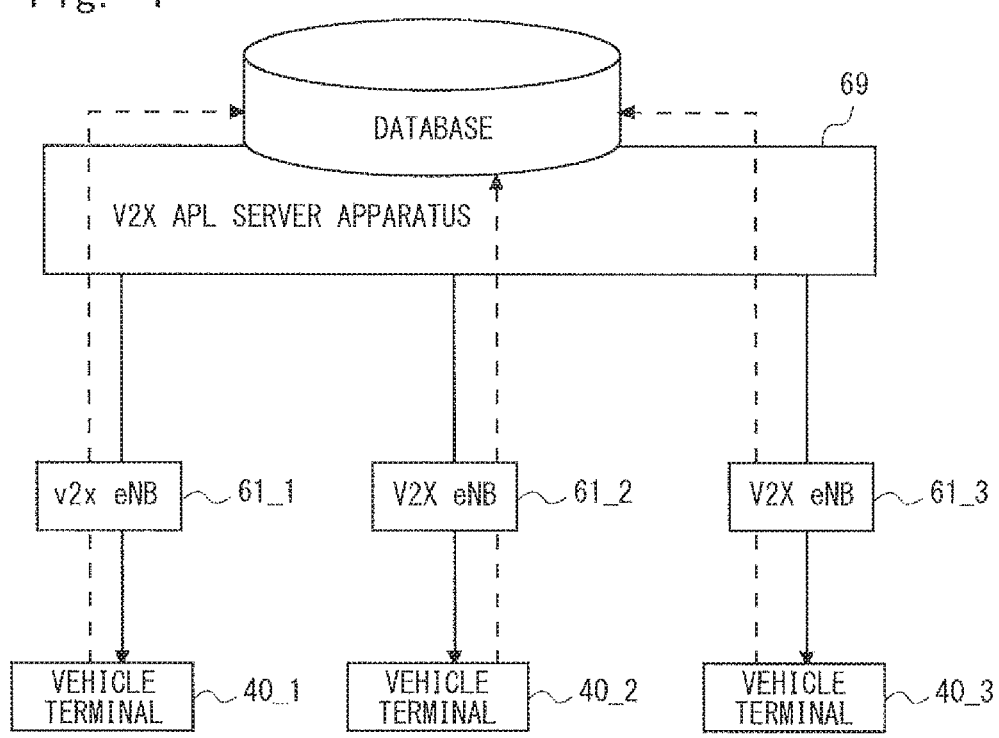
FIG. 4 is a view for explaining a service mode which uses the V2X APL server apparatus according to the second embodiment.

FIG. 4 illustrates service that the V2X APL server apparatus 69 stores information collected from the vehicle terminal 40_1, the vehicle terminal 40_2 and the vehicle terminal 40_3, in a database, and distributes a result obtained by analyzing the stored information to the vehicle terminal 40_1, the vehicle terminal 40_2 and the vehicle terminal 40_3. For example, the V2X APL server apparatuses 69 may analyze speed information of the vehicle terminal 40_1, the vehicle terminal 40_2 and the vehicle terminal 40_3 and generate traffic jam information. The V2X APL server apparatuses 69 may distribute the traffic jam information which is an analysis result to the vehicle terminal 40_1, the vehicle terminal 40_2 and the vehicle terminal 40_3.

Figure 5:
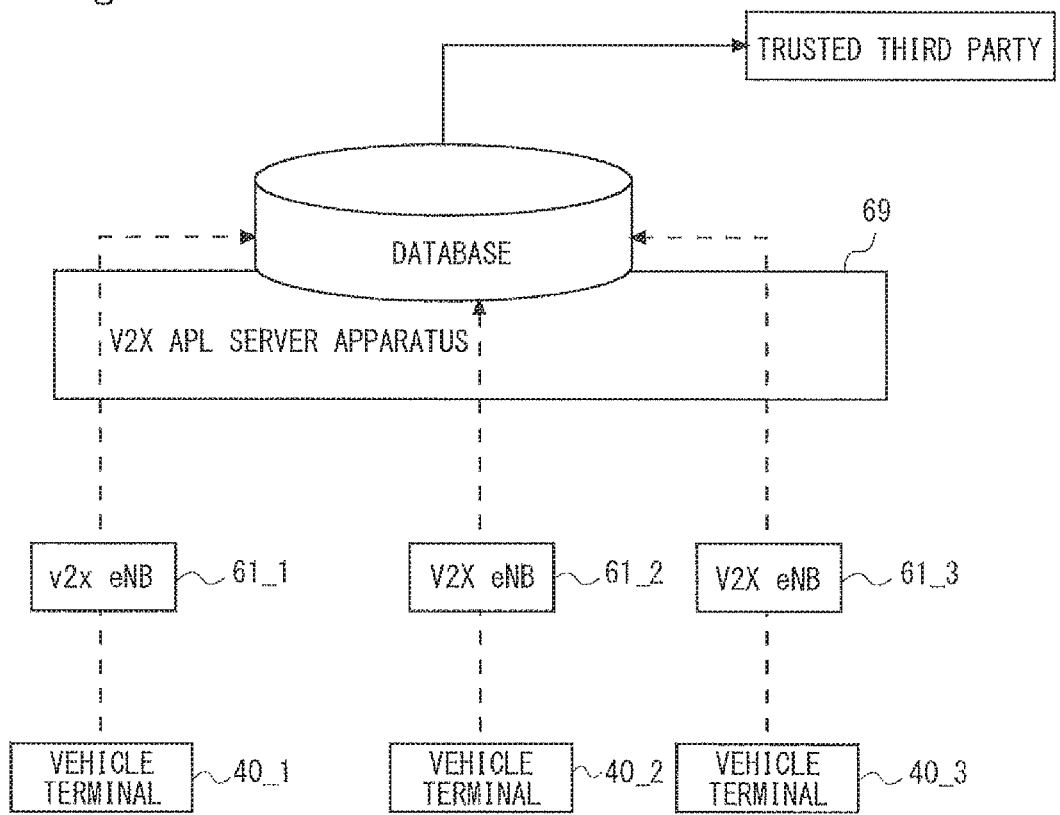
FIG. 5 is a view for explaining a service mode which uses the V2X APL server apparatus according to the second embodiment.

FIG. 5 illustrates service that the V2X APL server apparatuses 69 store the information collected from the vehicle terminal 40_1, the vehicle terminal 40_2 and the vehicle terminal 40_3, in the database, and provide a result obtained by analyzing the stored information to a trusted third party. The trusted third party may be, for example, a police or an insurance company.

For example, the V2X APL server apparatuses 69 can provide the collected information to the police for the sake of traffic light control. Further, the V2X APL server apparatuses 69 may analyze driving techniques of the vehicle terminal 40_1, the vehicle terminal 40_2 and the vehicle terminal 40_3 based on the collected information, and provide an analysis result to the insurance company. The insurance company may use the provided information to calculate an insurance fee.

Figure 6:
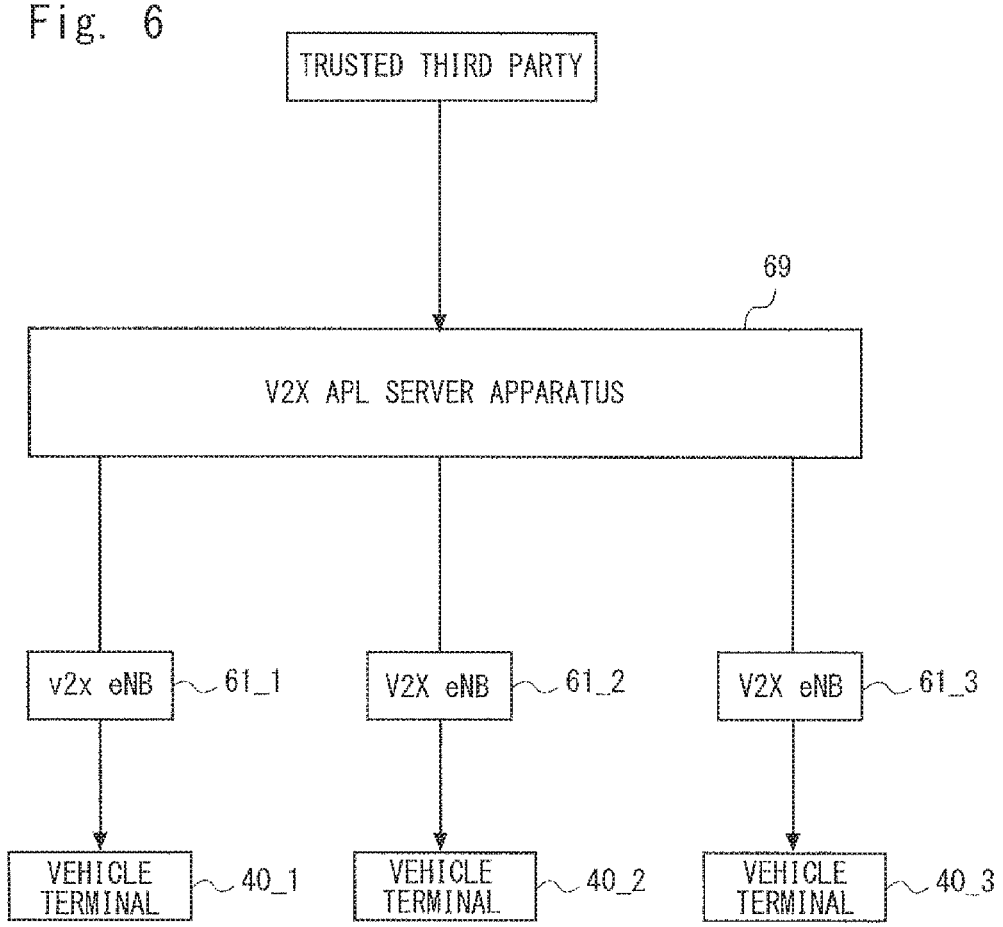
FIG. 6 is a view for explaining a service mode which uses the V2X APL server apparatus according to the second embodiment.

FIG. 6 illustrates service that the V2X APL server apparatuses 69 distribute information whose distribution is requested by the trusted third party, to the vehicle terminal 40_1, the vehicle terminal 40_2 and the vehicle terminal 40_3. When, for example, an organization which distributes traffic information requests the traffic information, the V2X APL server apparatuses 69 may distribute the traffic information whose distribution has been requested, to the vehicle terminal 40_1, the vehicle terminal 40_2 and the vehicle terminal 40_3.

Figure 7:
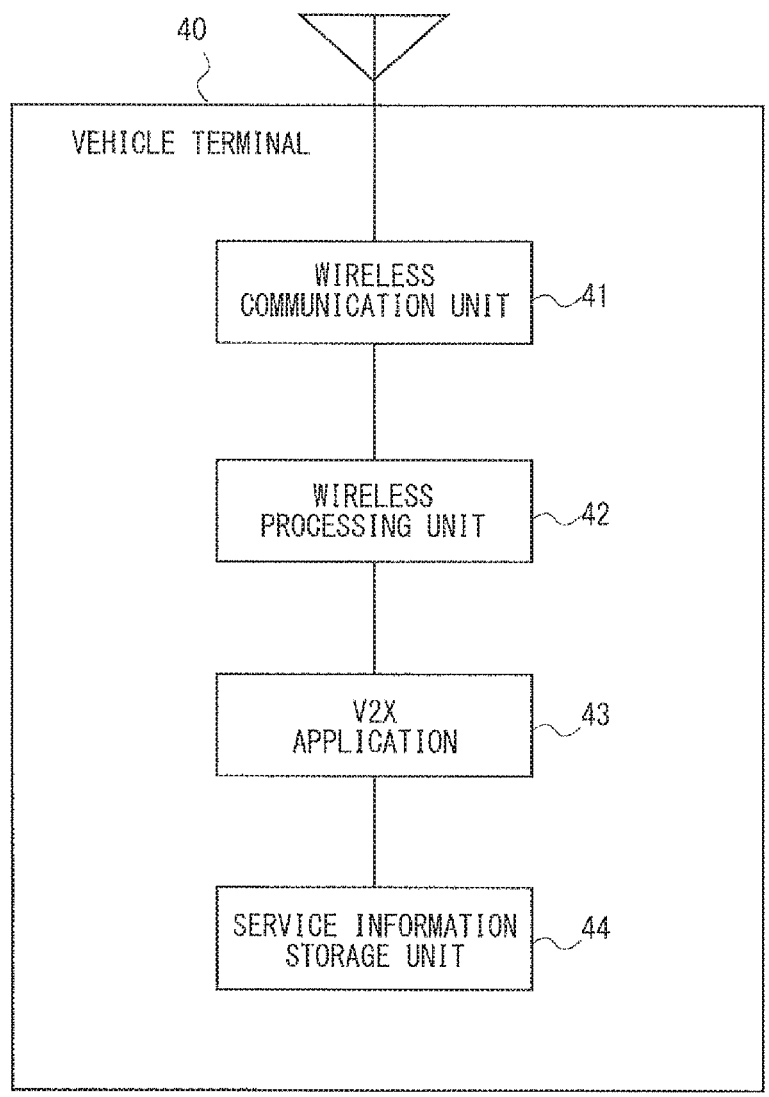
FIG. 7 is a configuration diagram of a vehicle terminal according to the second embodiment.

Subsequently, a configuration example of the vehicle terminal 40 according to the second embodiment of the present invention will be described with reference to FIG. 7. The vehicle terminal 40 includes a wireless communication unit 41, a wireless processing unit 42, a V2X application 43 and a service information storage unit 44. The wireless communication unit 41, the wireless processing unit 42, the V2X application 43 and the service information storage unit 44 may be software or modules which execute processing when the processor executes programs stored in the memory. Further, the wireless communication unit 41, the wireless processing unit 42 and the service information storage unit 44 may be configured by circuits or the like.

The wireless communication unit 41 is used as an interface for communicating with the V2X eNB 61. The wireless processing unit 42 executes signal processing related to a radio signal, and modulates and demodulates radio data, for example.

The V2X application 43 executes V2X service provided by the V2X APL server apparatus 69. For example, the V2X application 43 may display a message distributed from the V2X APL server apparatus 69, on a display unit (not illustrated) of the vehicle terminal 40. Alternatively, the V2X application 43 may control an operation of a vehicle in which the vehicle terminal 40 is installed according to an instruction distributed from the V2X APL server apparatus 69. Alternatively, the V2X application 43 may transmit information detected by the vehicle terminal 40 to the V2X APL server apparatus 69 via the wireless communication unit 41.

The service information storage unit 44 stores information which indicates service executed by the vehicle terminal 40 or parameter information which is necessary to execute the service.

Figure 8:
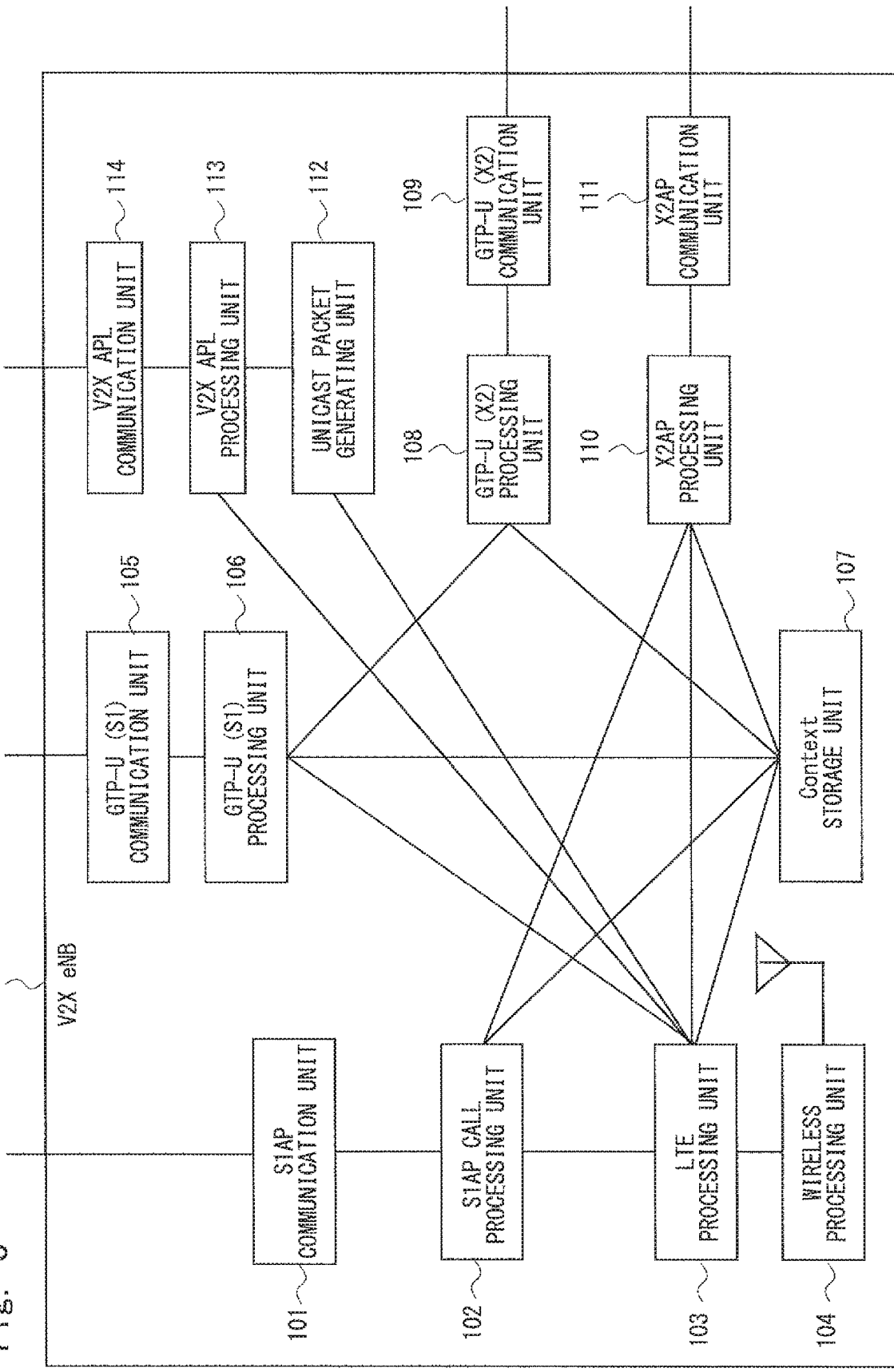
FIG. 8 is a configuration diagram of a V2X eNB according to the second embodiment.

Subsequently, a configuration example of the V2X eNB 61 according to the second embodiment of the present invention will be described with reference to FIG. 8. The V2X eNB 61 includes a S1AP communication unit 101, a S1AP call processing unit 102, an LTE processing unit 103, a wireless processing unit 104, a GTP (General Packet Radio Service Tunneling Protocol)-U (S1) communication unit 105, a GTP-U (S1) processing unit 106, a Context storage unit 107, a GTP-U (X2) processing unit 108, a GTP-U (X2) communication unit 109, an X2AP processing unit 110, an X2AP communication unit 111, a unicast packet generating unit 112, a V2X APL processing unit 113 and a V2X APL communication unit 114.

The V2X eNB 61 may be a computer apparatus which operates when the processor executes the program stored in the memory. Further, each component which configures the V2X eNB 61 may be software or a module which executes processing when the processor executes the program stored in the memory. Furthermore, each component which configures the V2X eNB 61 may be configured by a circuit.

The S1AP communication unit 101 is used as an interface for communicating with the MME 63. The S1AP call processing unit 102 executes call processing between the S1AP call processing unit 102 and the MME 63 by using information stored in the Context storage unit 107.

The S1AP call processing unit 102 transmits and receives a message related to the call processing between the S1AP call processing unit 102 and the MME 63 via the S1AP communication unit 101. Further, the S1AP call processing unit 102 selects a MME for performing the call processing by using the information stored in the Context storage unit 107. When, for example, the vehicle terminal 40 communicates with the V2X eNB 61, the S1AP call processing unit 102 selects the MME which can execute call processing control related to V2X service executed by the vehicle terminal 40.

The LTE processing unit 103 generates control data which is necessary to communicate with the vehicle terminal 40 by using LTE or generate user data. Alternatively, the LTE processing unit 103 may execute processing of managing a state of connection with the vehicle terminal 40. The wireless processing unit 104 is used as an interface for performing wireless communication with the vehicle terminal 40.

The GTP-U (S) communication unit 105 is used as an interface for communicating with the GW 67. The GTP-U (S1) processing unit 106 transmits and receives the user data to and from the GW 67 via the GTP-U (S1) communication unit 105.

The Context storage unit 107 stores information about the MME which needs to be connected to perform call processing related to the vehicle terminal 40.

The GTP-U (X2) communication unit 109 is used as an interface for communicating with the another V2X eNB 61. The GTP-U (X2) processing unit 108 transmits and receives the user data to and from the another V2X eNB 61 via the GTP-U (X2) communication unit 109.

The X2AP communication unit 111 is used as an interface for communicating with the another V2X eNB 61. The X2AP processing unit 110 transmits and receives the control data to and from the another V2X eNB 61 via the X2AP communication unit 111.

The unicast packet generating unit 112 generates unicast packets for transmitting a message related to the V2X service transmitted to the vehicle terminal 40. Further, the unicast packet generating unit 112 may convert the information distributed from the V2X APL server apparatus 69 into the unicast packets. Furthermore, when the V2X APL server apparatus 69 generates unicast packets the number of which corresponds to the number of vehicle terminals 40 to which the unicast packets are transmitted, the unicast packet generating unit 112 may not generate the unicast packets. The V2X APL communication unit 114 is used as an interface for communicating with the GW 67 which operates as the LGW. The V2X APL processing unit 113 transmits data transmitted from the vehicle terminal 40, to the GW 67 which operates as the LGW via the V2X APL communication unit 114.

Figure 9:
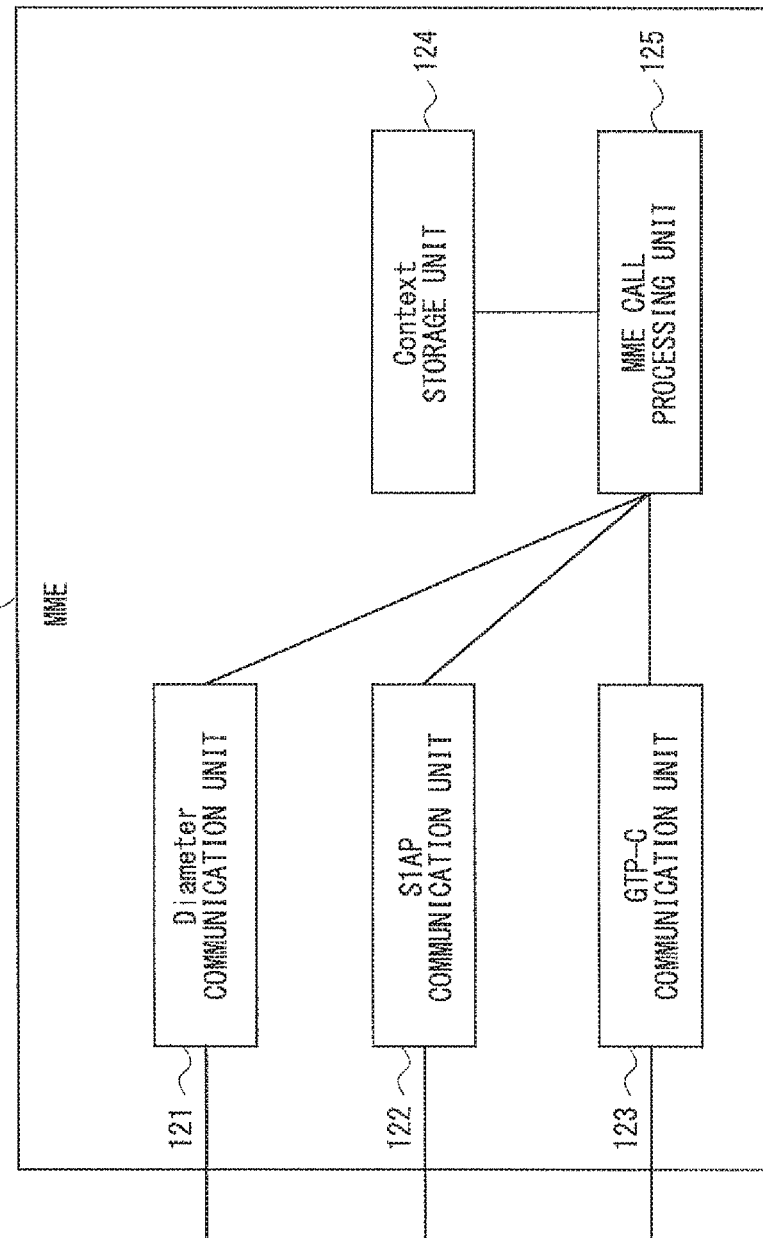
FIG. 9 is a configuration diagram of a MME according to the second embodiment.

Subsequently, a configuration example of the MME 63 according to the second embodiment of the present invention will be described with reference to FIG. 9.

The MME 63 includes a Diameter communication unit 121, a S1AP communication unit 122, a GTP-C communication unit 123, a Context storage unit 124 and a MME call processing unit 125.

The MME 63 may be a computer apparatus which operates when the processor executes the program stored in the memory. Further, each component which configures the MME 63 may be software or a module which executes processing when the processor executes the program stored in the memory. Furthermore, each component which configures the MME 63 may be configured by a circuit.

The Diameter communication unit 121 is used as an interface between the HSS 64 and the SCEF 65. The S1AP communication unit 122 is used as an interface between the V2X eNB 61 and the eNB 62. The GTP-C communication unit 123 is used as an interface between the GTP-C communication unit 123 and the GW 67.

The Context storage unit 124 stores subscriber information transmitted from the HSS 64 via the Diameter communication unit 121 and related to the vehicle terminals 40 and the device terminal 50. The Context storage unit 124 may be, for example, a memory in the MME 63 or an external memory apparatus attached to the MME 63.

The MME call processing unit 125 executes call processing by using Context information stored in the Context storage unit 124. The MME call processing unit 125 transmits and receives the message related to the call processing to and from the V2X eNB 61, the eNB 62, the HSS 64 or the GW 67 via the Diameter communication unit 121, the S1AP communication unit 122 or the GTP-C communication unit 123.

Figure 10:
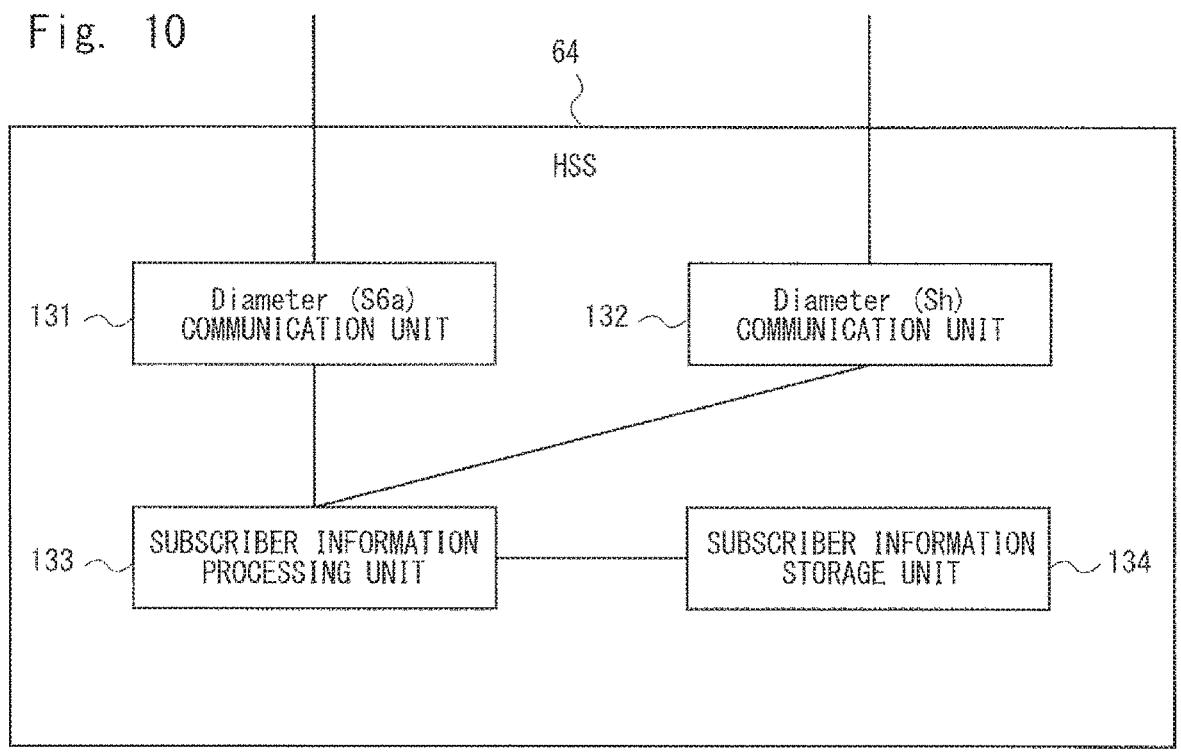
FIG. 10 is a configuration diagram of a HSS according to the second embodiment.

Subsequently, a configuration example of the HSS 64 according to the second embodiment of the present invention will be described with reference to FIG. 10. The HSS 64 includes a Diameter (S6a) communication unit 131, a Diameter (Sh) communication unit 132, a subscriber information processing unit 133 and a subscriber information storage unit 134.

The HSS 64 may be a computer apparatus which operates when the processor executes the program stored in the memory. Further, each component which configures the HSS 64 may be software or a module which executes processing when the processor executes the program stored in the memory. Furthermore, each component which configures the HSS 64 may be configured by a circuit.

The Diameter (S6a) communication unit 131 is used as an interface between the Diameter (S6a) communication unit 131 and the MME 63. The Diameter (Sh) communication unit 132 is used as an interface between the Diameter (Sh) communication unit 132 and the SCEF 65.

The subscriber information storage unit 132 stores the subscriber information related to the vehicle terminals 40 and the device terminal 50. The subscriber information processing unit 133 transmits the subscriber information stored in the subscriber information storage unit 134, to the MME 63 via the Diameter (S6a) communication unit 131. Further, the subscriber information processing unit 133 may execute processing of authenticating the SCEF 65 and the V2X APL server apparatus 69 via the Diameter (Sh) communication unit 132.

Subsequently, a configuration example of the V2X APL server apparatus 69 according to the second embodiment of the present invention will be described with reference to FIG. 1. The V2X APL server apparatus 69 includes a V2X APL processing unit 141, a service information storage unit 142 and a message communication unit 143.

The V2X APL server apparatus 69 may be a computer apparatus which operates when the processor executes the program stored in the memory. Further, each component which configures the V2X APL server apparatus 69 may be software or a module which executes processing when the processor executes the program stored in the memory. Furthermore, each component which configures the V2X APL server apparatus 69 may be configured by a circuit.

As illustrated in, for example, FIG. 12, the service information storage unit 142 holds a management table which associates identification information of each vehicle terminal which subscribes to V2X service, geography information or position information of each vehicle terminal, an IP address of each vehicle terminal and subscribed service information of each vehicle terminal.

The V2X APL processing unit 141 determines a distribution area of a message related to the V2X service by using the management table held in the service information storage unit 142. The message communication unit 143 distributes the message related to the V2X service to the V2X eNB 61 belonging to the distribution area determined by the V2X APL processing unit 141 via the GW 67. The message distributed by the message communication unit 143 may be distribution information displayed by the vehicle terminal 40, information for identifying the distribution destination vehicle terminal 40 and geography information indicating the distribution area.

The geography information may be, for example, information designated based on a latitude and a longitude or another information related to a geography. Further, the geography information may be position information of a relative position with respect to the specific vehicle terminal 40. Furthermore, the information for identifying the vehicle terminal 40 is, for example, a service group to which the vehicle terminal 40 belongs.

Still further, the V2X APL processing unit 141 collects information managed in the management table to update the management table stored in the service information storage unit 142. For example, the V2X APL processing unit 141 may collect information related to the V2X eNB connected with the vehicle terminal 40, from the MME 63 or the HSS 64 via the SCEF 65. Further, the V2X APL processing unit 141 may collect IP address information related to the vehicle terminal 40 via the SCEF 65. Furthermore, the V2X APL processing unit 141 may collect the geography information or the position information of the vehicle terminal 40 by making use of LCS (Location Service) defined by 3GPP.

Figure 13:
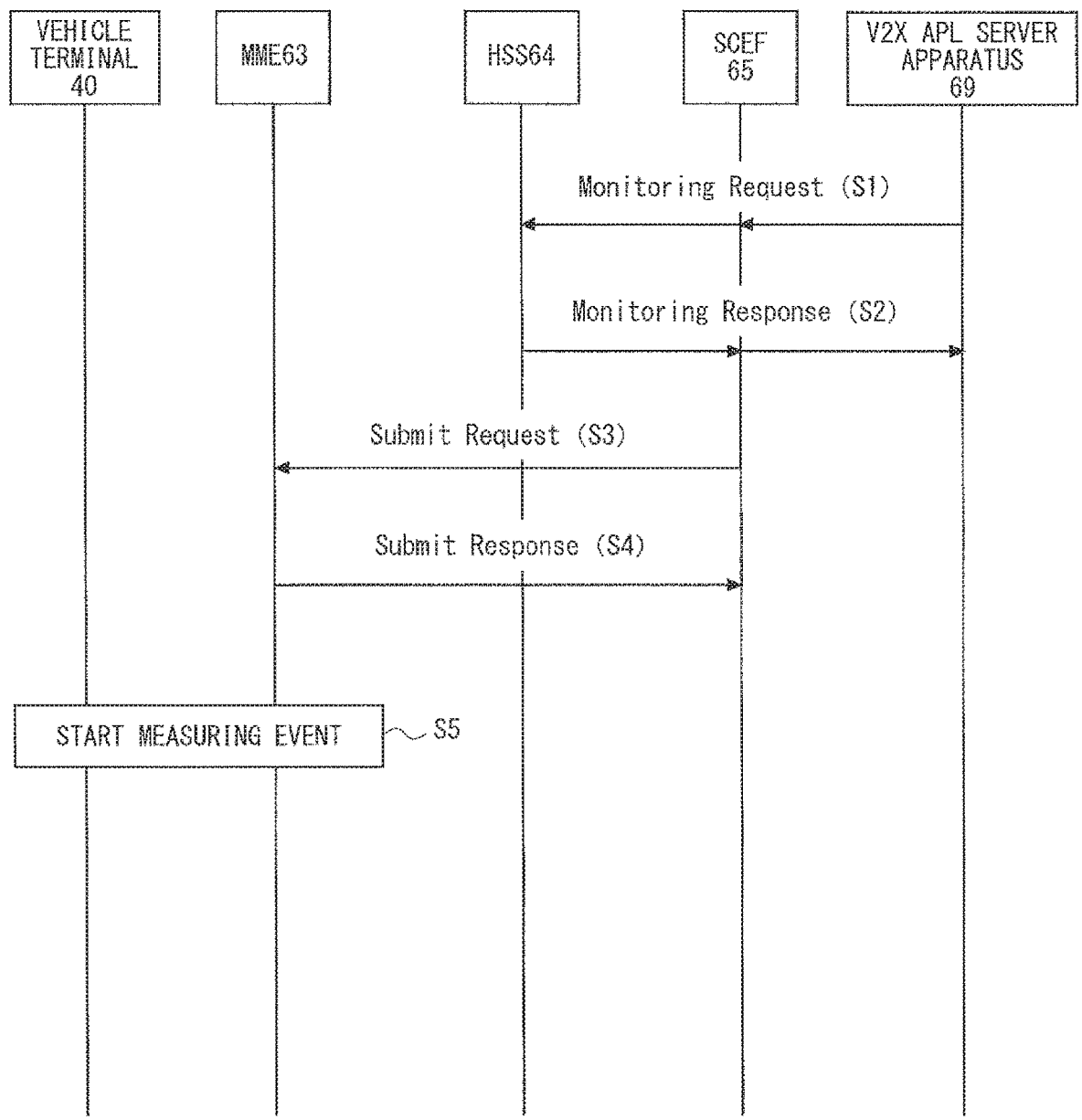
FIG. 13 is a view illustrating a flow of processing where a V2X APL processing unit detects an event according to the second embodiment.

In this regard, detailed processing where the V2X APL server apparatus 69 collects information related to the V2X eNB connected with the vehicle terminal 40 from the MME 63 via the SCEF 65 will be described with reference FIG. 13.

First, the V2X APL server apparatus 69 transmits a Monitoring Request message to the SCEF 65 to detect the V2X eNB connected with the vehicle terminal 40, and the SCEF 65 also transmits the Monitoring Request message to the HSS 64 (S1). Next, the HSS 64 transmits the Monitoring Response message as a response message to the SCEF 65, and the SCEF 65 also transmits the Monitoring Response message to the V2X APL server apparatus 69 (S2).

Next, the SCEF 65 transmits, for example, a Submit Request message for instructing to detect whether or not the V2X eNB connected with the vehicle terminal 40 has been changed, as monitoring contents of the vehicle terminal 40 to the MME 63 (S3). The HSS 64 may transmit the Submit Request message to the MME 63. Next, the MME 63 transmits the Submit Response message as a response to the Submit Request message to the SCEF 65 (S4). The MME 63 may transmit the Submit Response message to the HSS 64 when the HSS 64 transmits the Submit Request message.

Next, when receiving the Submit Request message, the MME 63 starts monitoring the V2X eNB connected with the vehicle terminal 40 (S5). That the MME 63 starts monitoring the V2X eNB connected with the vehicle terminal 40 may be paraphrased as start of event measurement.

Figure 14:
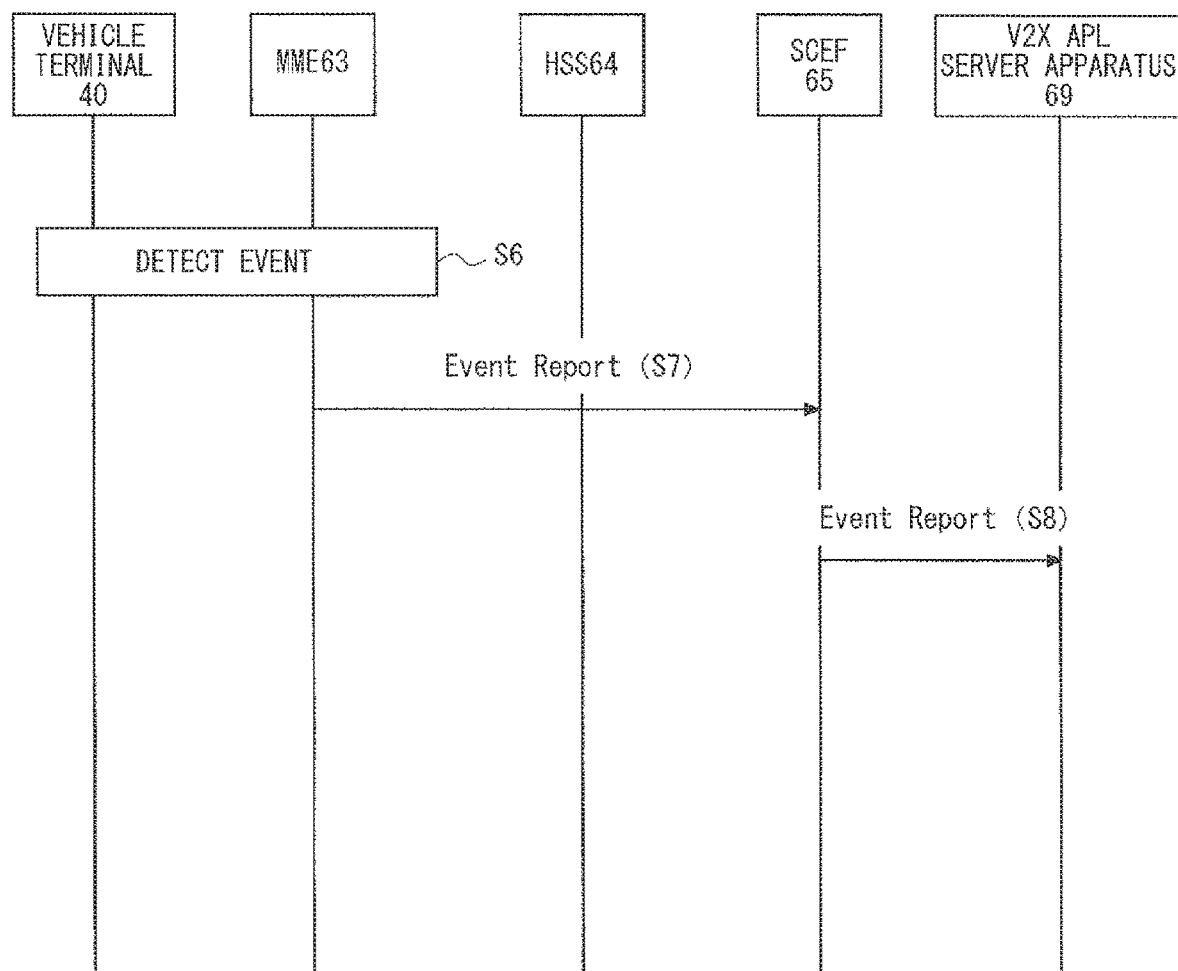
FIG. 14 is a view illustrating a flow of the processing where the V2X APL processing unit detects the event according to the second embodiment.

Subsequently, event detection processing according to the second embodiment of the present invention will be described with reference to FIG. 14. In other words, a flow of processing of detecting a change of the V2X eNB connected with the vehicle terminal 40 will be described. First, the MME 63 detects an event that the V2X eNB connected with the vehicle terminal 40 has been changed (S6). Next, the MME 63 transmits to the SCEF 65 an Event Report message to which an event detection result has been set (S7). The MME 63 may transmit the Event Report message to the SCEF 65 via the HSS 64. Next, the SCEF 65 transmits the Event Report message transmitted from the MME 63, to the V2X APL server apparatus 69 (S8). Thus, the V2X APL server apparatus 69 may collect information related to the V2X eNB connected with the vehicle terminal 40.

Figure 11:
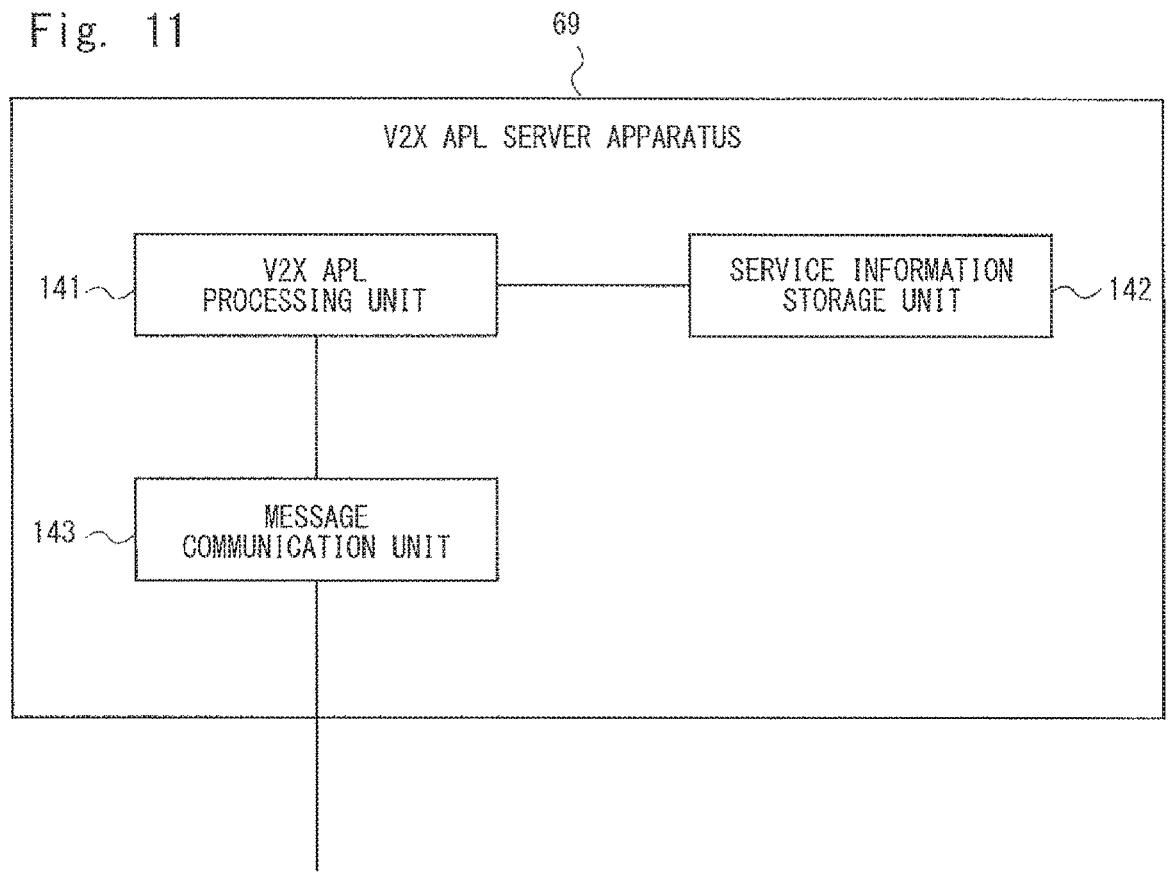
FIG. 11 is a configuration diagram of the V2X APL server apparatus according to the second embodiment.

Back to FIG. 11, when collecting the information related to the vehicle terminal 40, the V2X APL processing unit 141 may designate an IMSI (International Mobile Subscriber Identity) of the vehicle terminal 40 and collect the information related to the vehicle terminal 40. Alternatively, the V2X APL processing unit 141 may collect the information related to the vehicle terminal 40 by using the identification information of the vehicle terminal 40 held by the V2X APL server apparatus 69. In this case, the SCEF 65 may associate and manage the identification information of the vehicle terminal 40 held by the V2X APL server apparatus 69 and the IMSI of the vehicle terminal 40.

When the V2X APL server apparatus 69 requests to collect the information related to the vehicle terminal 40, the SCEF 65 may collect information designated by the MME 63 or the HSS 64 by using the IMSI related to the vehicle terminal 40.

Further, the V2X APL processing unit 141 may collect the subscriber information related to the vehicle terminal 40, from a database such as an AAA server which manages the V2X service.

Figure 15:
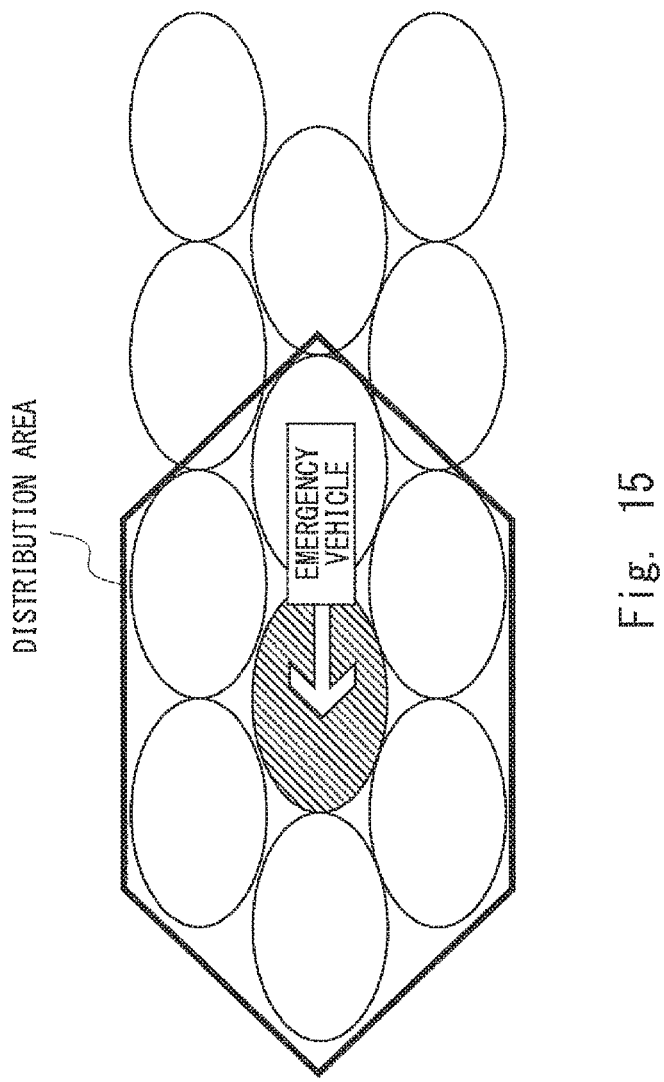
FIG. 15 is a view for explaining a distribution area selected according to service contents according to the second embodiment.

Hereinafter, examples of distribution areas selected according to service contents will be described with reference to FIGS. 15 to 17. FIG. 15 illustrates the distribution area in case where, for example, an emergency vehicle enters a hatched area. When detecting the entry of the emergency vehicle in the hatched area, the V2X APL processing unit 141 may distribute information indicating the entry of the emergency vehicle to vehicles located in areas around the hatched area as illustrated in FIG. 15.

Figure 16:
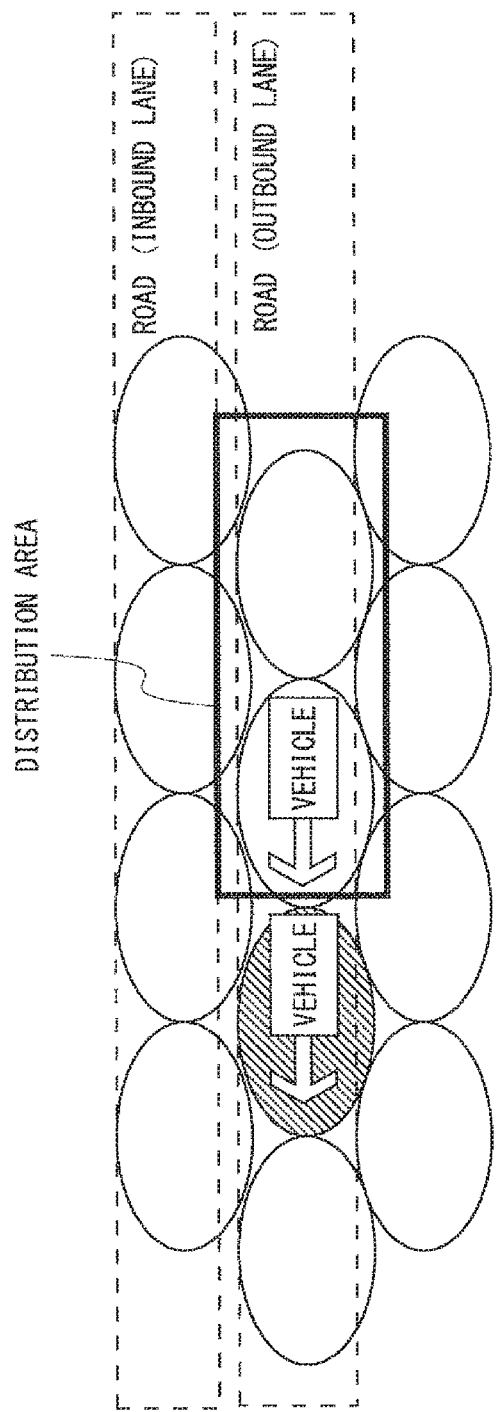
FIG. 16 is a view for explaining the distribution area selected according to the service contents according to the second embodiment.

FIG. 16 illustrates the distribution area in case where, for example, the V2X APL processing unit 141 detects a vehicle in traffic jam or a vehicle which has applied a brake in a hatched area. When detecting the vehicle in the traffic jam or the vehicle which has applied the brake, the V2X APL processing unit 141 may distribute information indicating presence of the vehicle in the traffic jam or the vehicle which has applied the brake, to vehicles located at the back of the detected vehicle. The information indicating the presence of the vehicle in the traffic jam or the vehicle which has applied the brake can be used to prevent a collision accident of following vehicles.

Figure 17:
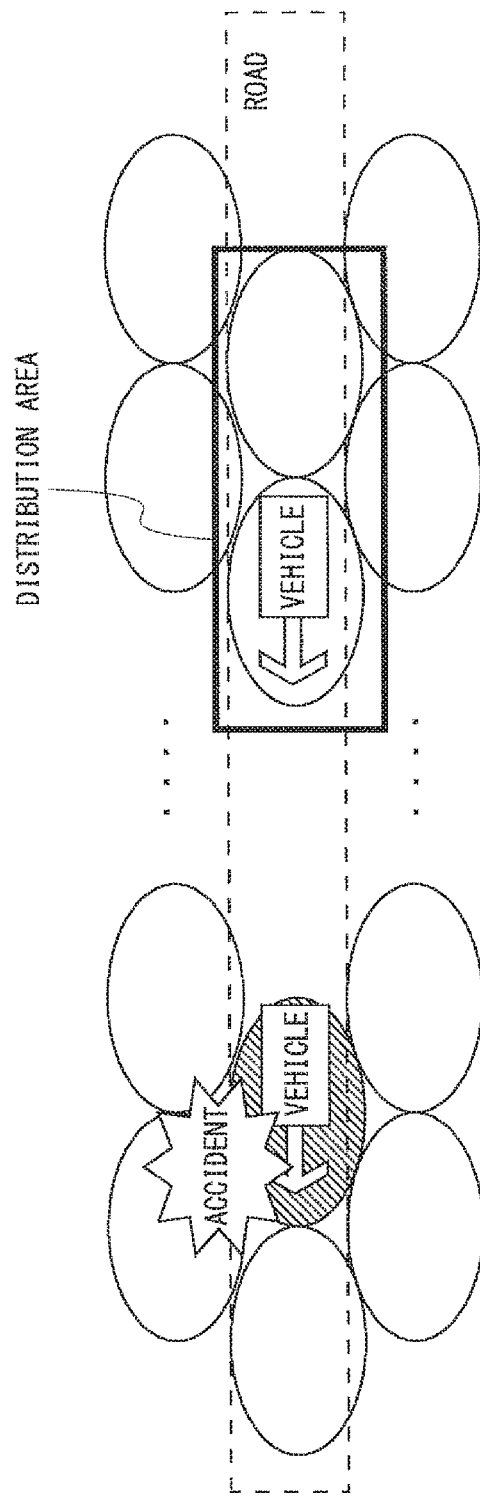
FIG. 17 is a view for explaining the distribution area selected according to the service contents according to the second embodiment.

FIG. 17 illustrates the distribution area in case where, for example, the V2X APL processing unit 141 is notified of occurrence of an accident from a vehicle located in a hatched area. In this case, the V2X APL processing unit 141 may distribute information indicating the occurrence of the vehicle to vehicles which are assumed to enter the accident occurrence area after a predetermined time passes. In other words, the V2X APL processing unit 141 may distribute information indicating the occurrence of the accident, to vehicles which are located at the back of the accident occurrence area and located in an area which is a predetermined distance apart from the accident occurrence area. The information indicating the occurrence of the accident can be used to take a roundabout route for the accident occurrence area.

Figure 18:
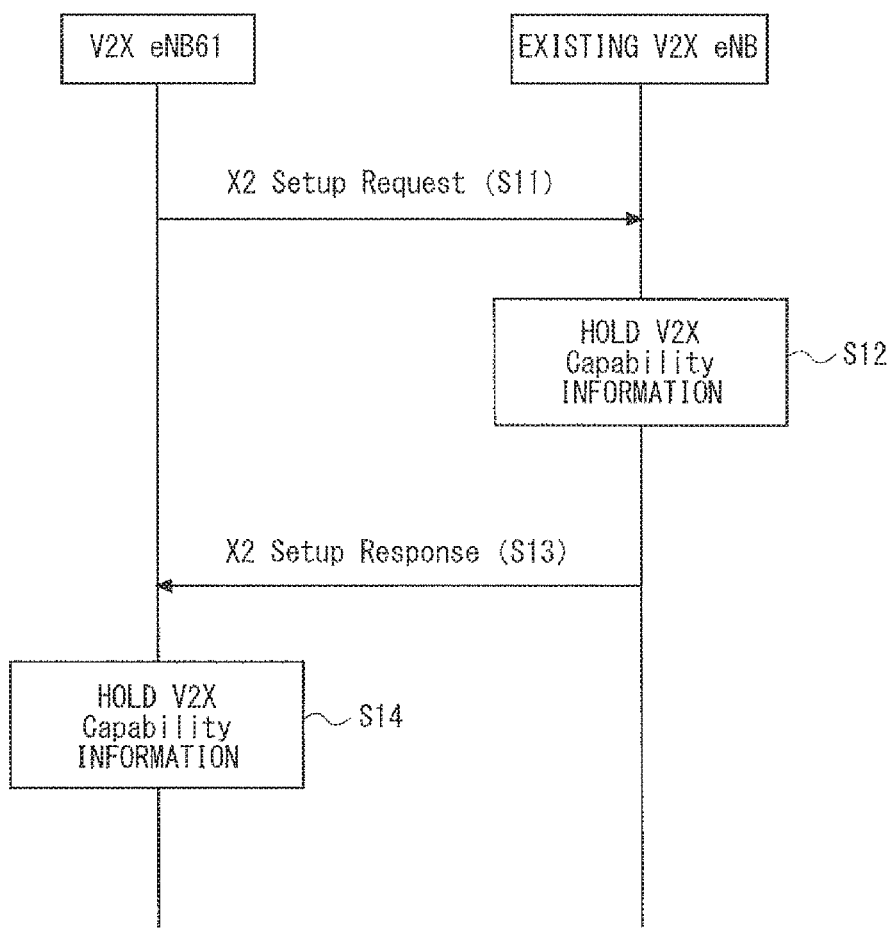
FIG. 18 is a view illustrating a flow of processing during initial setting of a V2X eNB according to the second embodiment.

Subsequently, a flow of processing during initial setting of the V2X eNB 61 according to the second embodiment of the present invention will be described with reference to FIG. 18. The flow of processing of installing the V2X eNB 61 near the existing V2X eNB which has already been installed will be described with reference to FIG. 18.

First, the V2X eNB 61 transmits an X2 Setup Request message to the existing V2X eNB (S11). The V2X eNB 61 sets to the X2 Setup Request message a parameter indicating that the V2X eNB 61 is a vehicle base station which communicates with the vehicle terminal 40. The parameter indicating that the V2X eNB 61 is a vehicle base station which communicates with the vehicle terminal 40 may be V2X Capability information.

Next, the existing V2X eNB holds the V2X Capability information set to the received X2 Setup Request message (S12). Next, the existing V2X eNB transmits to the V2X eNB 61 the X2 Setup Response message to which the V2X Capability information indicating that the existing V2X eNB is the vehicle base station has been set (S13). Next, the V2X eNB 61 holds the V2X Capability information set to the received X2 Setup Response message. The V2X Capability information may include a more detailed service type, a provider and other attribute information. The V2X Capability information set to a message different from the X2 Setup Request message may also include a more detailed service type, a provider and other attribute information likewise.

Further, when deciding in step S12 that the V2X Capability information is not set to the received X2 Setup Request message or it is not possible to meet a request notified by the V2X Capability information, the existing V2X eNB may transmit to the V2X eNB 61 a message to which a Cause value indicating rejection of connection has been set.

Figure 19:
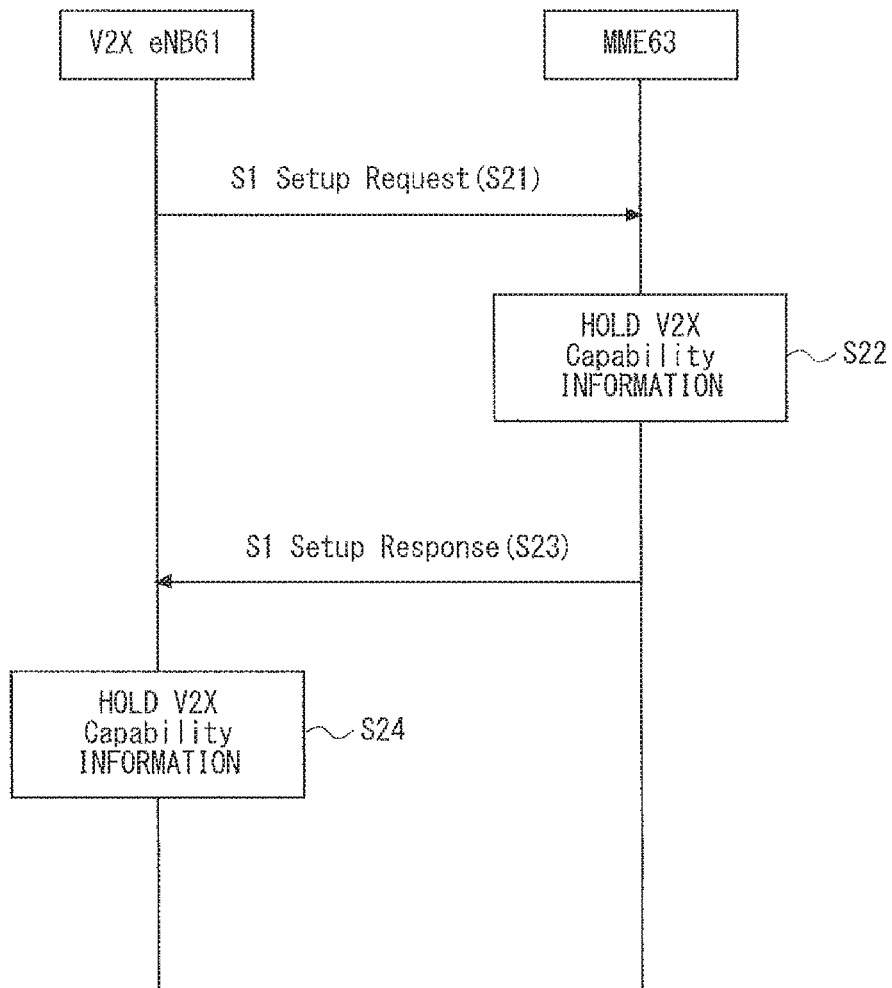
FIG. 19 is a view illustrating the flow of the processing during the initial setting of the V2X eNB according to the second embodiment.

Subsequently, a flow of processing during initial setting of the V2X eNB 61 according to the second embodiment of the present invention will be described with reference to FIG. 19. The processing during the initial setting between the V2X eNB 61 and the MME 63 will be described with reference to FIG. 19.

First, the V2X eNB 61 transmits a S1 Setup Request message to the MME 63 (S21). The V2X eNB 61 sets the V2X Capability information to the S1 Setup Request message.

Next, the MME 63 holds the V2X Capability information set to the received S1 Setup Request message (S22). Next, the MME 63 transmits to the V2X eNB 61 the S1 Setup Response message to which the V2X Capability information indicating that the MME 63 is the MME which can accommodate the vehicle base station has been set (S23). Next, the V2X eNB 61 holds the V2X Capability information set to the received S Setup Response message.

Further, when deciding in step S22 that the V2X Capability information is not set to the received S1 Setup Request message or it is not possible to meet the request notified by the V2X Capability information, the MME 63 may transmit to the V2X eNB 61 the message to which the Cause value indicating rejection of connection has been set.

Furthermore, when finishing the initial setting of the existing V2X eNB and the MME 63, the V2X eNB 61 transmits broadcast information indicating that the V2X eNB 61 is the vehicle base station, to all terminals such as the vehicle terminals 40 and the device terminal 50 located in a communication area formed by the V2X eNB 61. Still further, the V2X eNB 61 may transmit a list of V2X eNBs whose initial setting has been finished, as a Neighbor Cell List with the broadest information.

Moreover, the vehicle terminal 40 may transmit to the V2X eNB 61 a measurement report related to the V2X eNB selected from the Neighbor List transmitted from the V2X eNB 61 when performing handover. Alternatively, when the vehicle terminal 40 is handed over, the V2X eNB 61 may select the V2X eNB which can execute requested V2X service from a plurality of V2X eNBs measured in the measurement report by the vehicle terminal 40, and hand over the vehicle terminal 40 to the selected V2X eNB.

Further, the vehicle terminal 40 is handed over from the V2X eNB 61 to another V2X eNB. The V2X eNB 61 transmits and receives user data related to the vehicle terminal 40 to and from the another V2X eNB connected via an X2 interface.

Figure 20:
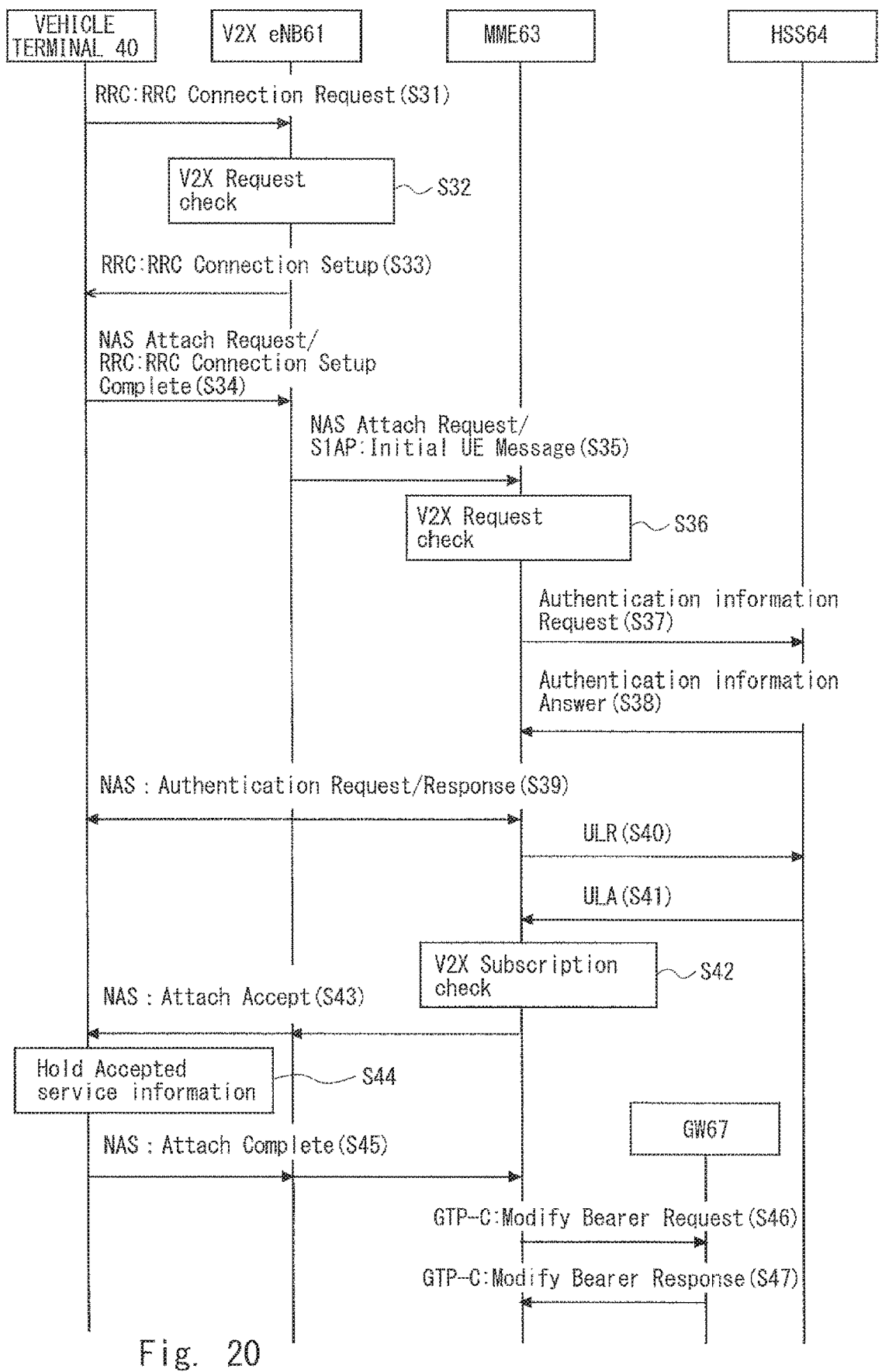
FIG. 20 is a view illustrating a flow of Attach processing according to the second embodiment.

Subsequently, a flow of Attach processing according to the second embodiment of the present invention will be described with reference to FIG. 20. First, the vehicle terminal 40 transmits a RRC: RRC Connection Request message to the V2X eNB 61 to establish RRC (Radio Resource Control) connection with the V2X eNB 61 (S31). The vehicle terminal 40 sets information indicating that the vehicle terminal 40 is a vehicle terminal and requests vehicle related service, to the RRC: RRC Connection Request message. The information indicating to request the vehicle related service may be, for example, a V2X Service Request IE (Information Element). Next, the V2X eNB 61 decides whether or not the V2X Service Request IE is set to the received RRC: RRC Connection Request message (S32). When deciding that the V2X Service Request IE is set to the RRC: RRC Connection Request message, the V2X eNB 61 transmits the RRC: RRC Connection Setup message to the vehicle terminal 40 (S33). Further, when deciding in step S32 that the V2X Service Request TE is not set to the received RRC: RRC Connection Request message or it is not possible to meet the request notified by the V2X Capability information, the V2X eNB 61 may transmit to the vehicle terminal 40 the message to which the Cause value indicating the rejection of connection has been set.

Next, the vehicle terminal 40 transmits to the V2X eNB 61 a NAS (Non-Access Stratum): Attach Request/RRC: RRC Connection Setup Complete message to transmit a response message to the RRC: RRC Connection Setup message or execute the Attach processing (S34). The vehicle terminal 40 sets the V2X Service Request IE to the NAS: Attach Request message. Next, the V2X eNB 61 transmits to the MME 63 a NAS: Attach Request/S1AP: Initial UE Message to which the V2X Service Request IE has been set (S35).

Next, the MME 63 decides whether or not the V2X Service Request IE has been set to the received NAS: Attach Request message (S36). When deciding that the V2X Service Request TE is set to the NAS: Attach Request message, the MME 63 transmits an Authentication Information Request message to the HSS 644 (S37). Further, when deciding in step S36 that the V2X Service Request IE is not set to the received NAS: Attach Request message or it is not possible to meet the request notified by the V2X Capability information, the MME 63 may transmit to the V2X eNB 61 the message to which the Cause value indicating the rejection of connection has been set.

Next, the HSS 64 transmits to the MME 63 the Authentication Information Answer message to which an authentication parameter related to the vehicle terminal 40 has been set (S38).

Next, the MME 63 performs processing of authenticating the vehicle terminal 40 by transmitting and receiving a NAS: Authentication Request/Response message to and from the vehicle terminal 40 (S39).

When finishing the processing of authenticating the vehicle terminal 40, the MME 63 transmits an Update Location Request (ULR) message to the HSS 64 (S40). Next, the HSS 64 transmits to the MME 63 an Update Location Request Ack (ULA) message to which the subscriber information related to the V2X service has been set.

Next, the MME 63 may decide whether or not the vehicle terminal 40 is a terminal which can receive the V2X service based on the subscriber information set to the ULA message (S42). When deciding that the vehicle terminal 40 is the terminal which can receive the V2X service, the MME 63 transmits a NAS: Attach Accept message to the vehicle terminal 40 via the V2X eNB 61 (S43). The MME 63 may set information related to a type of V2X service permitted in the subscriber information, to the NAS: Attach Accept message. Further, when permitting only conditional or limited V2X service, the MME 63 may set contents of permitted V2X service to the NAS: Attach Accept message.

Next, the vehicle terminal 40 holds information to which the NAS: Attach Accept message has been set and which relates to the type of the permitted V2X service (S44). Next, the vehicle terminal 40 transmits the NAS: Attach Complete message to the MME 63 via the V2X eNB 61 (S45).

Next, the MME 63 transmits a GTP-C: Modify Bearer Request message to the G 67 to set and update a bearer for allowing the V2X eNB 61 to transmit and receive the user data to and from the GW 67 (S46). Next, the GW 67 transmits a GTP-C: Modify Bearer Response message as a response to the MME 63 (S47).

As described above, after finishing the Attach processing, the vehicle terminal 40 communicates with the V2X APL server apparatus 69 via the established bearer. In this case, the vehicle terminal 40 needs to learn an IP address of the V2X APL server apparatus 69 to communicate with the V2X APL server apparatus 69 which can execute requested V2X.

In this regard, a scheme of the vehicle terminal 40 for communicating with the desired V2X APL server apparatus 69 includes a DNS (Domain Name System) scheme, an Anycast scheme and a PCO (Protocol Configuration Option)/DHCP (Dynamic Host Configuration Protocol) scheme.

The DNS scheme includes generating a FQDN (Fully Qualified Domain Name) of the desired V2X APL server apparatus 69, and obtaining a host name of the desired V2X APL server apparatus 69 by DNS resolution. Further, a method of the vehicle terminal 40 for obtaining an IP address of a DNS server includes notifying the vehicle terminal 40 of the IP address of the DNS server by using a PCO (Protocol Configuration Option) during the Attach processing process. Alternatively, after finishing the Attach processing, the vehicle terminal 40 may be notified of the IP address of the DNS server by DHCP from the GW 67 via a default bearer.

The Anycast scheme assumes that a predetermined Anycast address is set to the V2X APL server apparatus 69, and the vehicle terminal 40 may designate the Anycast address after finishing the Attach processing, and communicate with the V2X APL server apparatus 69.

According to the PCO/DHCP scheme, the vehicle terminal 40 may obtain a host name of the V2X APL server apparatus 69 from the GW 67 by using PCO during the Attach. Alternatively, after finishing the Attach processing, the vehicle terminal 40 may obtain a host name of the V2X APL server apparatus 69 by DHCP from the GW 67 via a default bearer.

Figure 2:
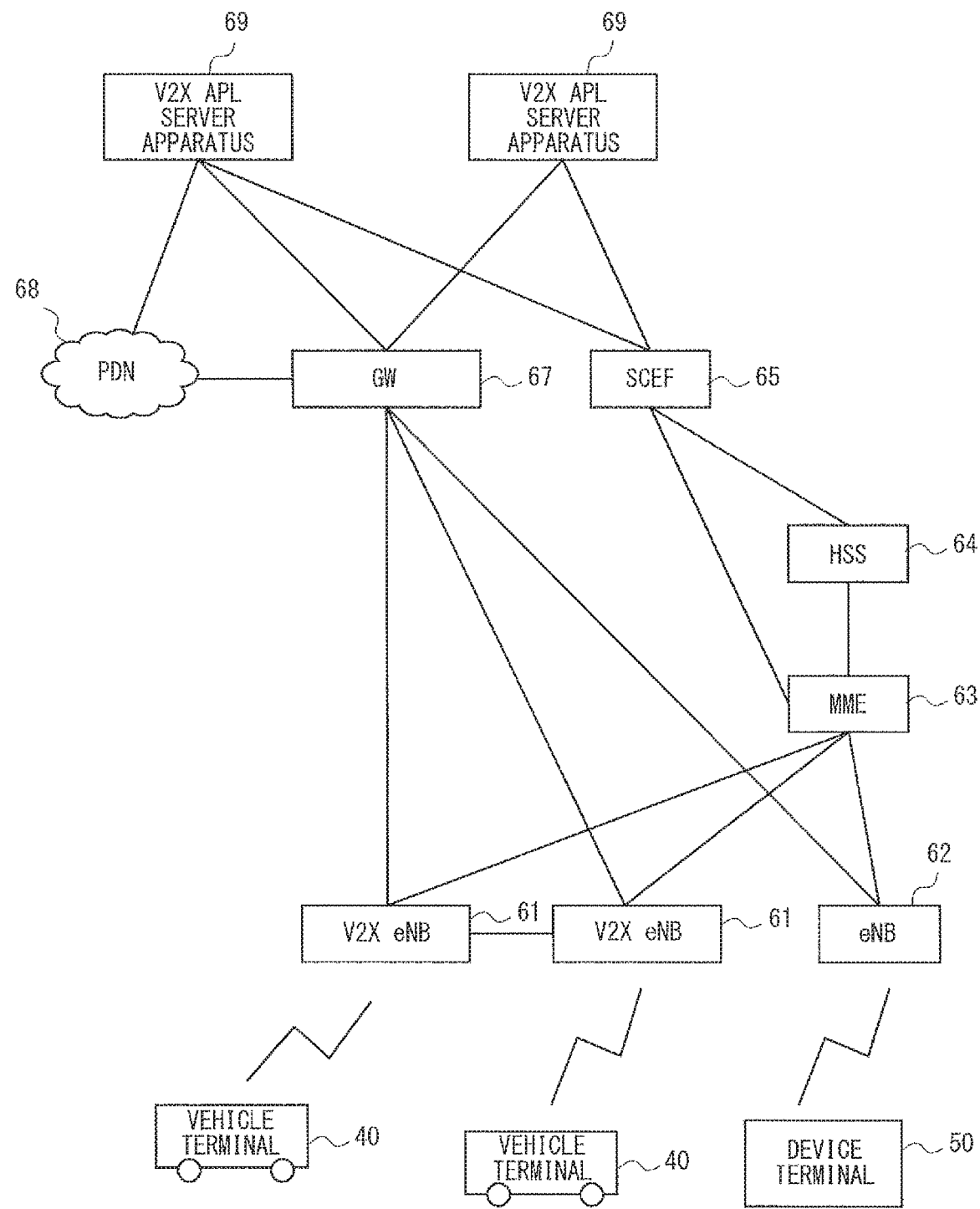
FIG. 2 is a configuration diagram of a vehicle communication system according to a second embodiment.
Figure 21:
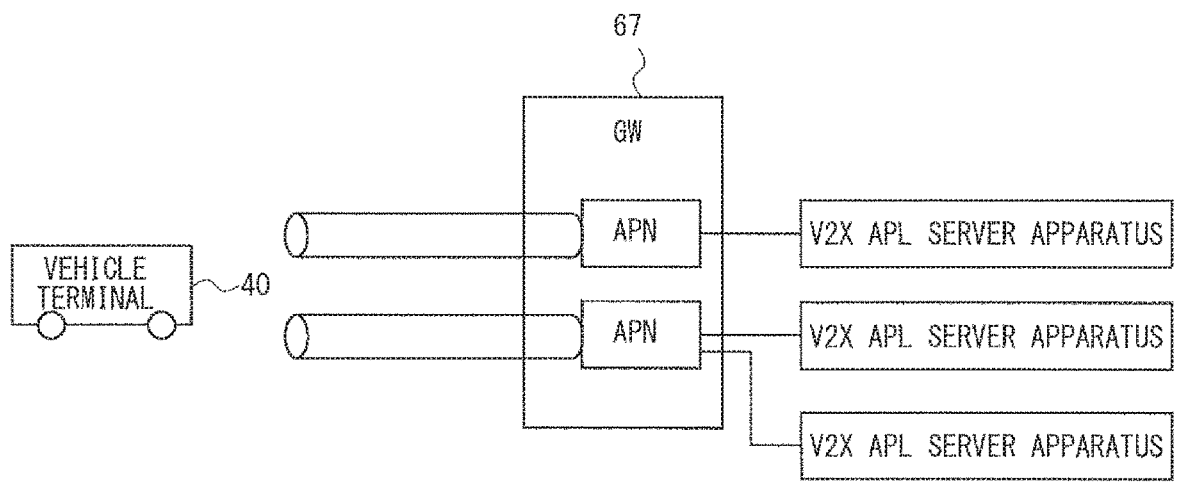
FIG. 21 is a view illustrating a relationship between a plurality of V2X APL server apparatuses according to the second embodiment and an APN.
Figure 22:
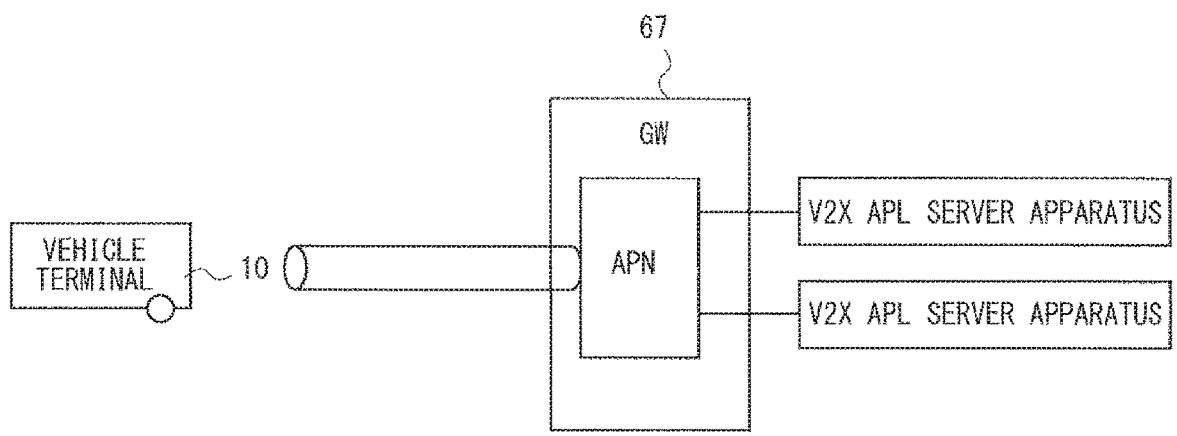
FIG. 22 is a view illustrating the relationship between a plurality of V2X APL server apparatuses according to the second embodiment and the APN.

In this regard, there may be a plurality of V2X APL server apparatuses 69 which can communicate with the vehicle terminals 40 as illustrated in FIG. 2. In this case, as illustrated in FIG. 21, a plurality of V2X APL server apparatuses 69 may be classified into a plurality of APNs (Access Point Name) and accommodated or may be accommodated in a single APN as illustrated in FIG. 22. Further, when the MME 63 determines to provide V2X service, the MME 63 may add a character string indicating the V2X service before or after an APN declared by the vehicle terminal 40 or a default APN provided from the HSS 64. For address resolution of the P-GW, an APN to which the character string indicating the V2X has been added may be used.

As described above, the vehicle communication system according to the second embodiment of the present invention distributes messages in units of the vehicle terminals 40 according to the V2X service subscribed by the vehicle terminals 40. Further, when the LGW is used as the GW 67 and the LGW is installed near the V2X eNB 61, the V2X APL server apparatus 69 is also installed near the V2X eNB 61.

Hence, when the V2X APL server apparatus 69 is installed near the V2X eNB 61, delay of a message distributed from the V2X APL server apparatus 69 becomes a little compared to a message relayed via the S-GW and the P-GW in the mobile network. Consequently, it is possible to satisfy strict request conditions of V2X service, too, which needs to be timely such as automatic driving of the vehicle terminal 40.

Further, the present invention has been described as a hardware configuration in the above embodiments. However, the present invention is not limited to this. The present invention can also realize processing of the vehicle terminals 40, the V2X eNB 61, the MME and the V2X APL server apparatus by causing a CPU (Central Processing Unit) to execute a computer program.

In the above example, the program can be stored by using various types of non-transitory computer readable media, and be supplied to a computer. The non-transitory computer readable media include various types of tangible storage media. The non-transitory computer readable media include, for example, magnetic recording media (e.g., flexible disks, magnetic tapes and hard disk drives), magneto optical recording media (e.g., optical magnetic disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMs (Random Access Memory)). Further, the programs may be supplied to the computers by various types of transitory computer readable media. The transitory computer readable media include, for example, electrical signals, optical signals and electromagnetic waves. The transitory computer readable media can supply the programs to the computers via wired communication channels such as electrical cables or optical wires or wireless communication channels.

In addition, the present invention is not limited to the above embodiments, and can be optionally changed without departing from the spirit of the invention.

The present invention has been described above with reference to the embodiments. However, the present invention is not limited to the above. The configurations and the details of the present invention can be variously changed within the scope of the invention as long as one of ordinary skill in the art can understand the changes.

This application claims priority to Japanese Patent Application No. 2015-058152 filed on Mar. 20, 2015, the entire contents of which are incorporated by reference herein.

REFERENCE SIGNS LIST

10 VEHICLE TERMINAL
11 VEHICLE TERMINAL

20 VEHICLE BASE STATION
21 VEHICLE BASE STATION
30 SERVER APPARATUS
40 VEHICLE TERMINAL
41 WIRELESS COMMUNICATION UNIT
42 WIRELESS PROCESSING UNIT
43 V2X APPLICATION
44 SERVICE INFORMATION STORAGE UNIT
50 DEVICE TERMINAL
61 V2X eNB
62 eNB
63 MME
64 HSS
65 SCEF
67 GW
68 PDN
69 V2X APL SERVER APPARATUS
101 S1AP COMMUNICATION UNIT
102 S1AP CALL PROCESSING UNIT
103 LTE PROCESSING UNIT
104 WIRELESS PROCESSING UNIT
105 GTP-U (S1) COMMUNICATION UNIT
106 GTP-U (S1) (S1 PROCESSING UNIT)
107 Context STORAGE UNIT
108 GTP-U (X2) PROCESSING UNIT
109 GTP-U (X2) COMMUNICATION UNIT
110 X2AP PROCESSING UNIT
111 X2AP COMMUNICATION UNIT
112 UNICAST PACKET GENERATING UNIT
113 V2X APL PROCESSING UNIT
114 V2X APL COMMUNICATION UNIT
121 Diameter COMMUNICATION UNIT
122 S1AP COMMUNICATION UNIT
123 GTP-C COMMUNICATION UNIT
124 Context STORAGE UNIT
125 MME CALL PROCESSING UNIT
131 Diameter (S6a) COMMUNICATION UNIT
132 Diameter (Sh) COMMUNICATION UNIT
133 SUBSCRIBER INFORMATION PROCESSING UNIT
134 SUBSCRIBER INFORMATION STORAGE UNIT
141 V2X APL PROCESSING UNIT
142 SERVICE INFORMATION STORAGE UNIT
143 MESSAGE COMMUNICATION UNIT

The invention claimed is:

1. A User Equipment (UE) in a vehicle communication system including a Vehicle to X (V2X) application server and a base station, the UE comprising:
at least one processor; and
at least one memory coupled to the at least one processor, the at least one memory storing instructions that when executed by the at least one processor cause the at least one processor to:
store information that indicates a V2X service executed by the UE,
generate a Fully Qualified Domain Name (FQDN) of the V2X application server,
obtain IP address of the V2X application server based on Domain Name System (DNS) scheme,
send the information to the V2X application server according to the IP address via the base station, and
receive a message related to the V2X service using a unicast via the base station from the V2X application server based on location information of the UE.

2. The UE according to claim 1, wherein the vehicle communication system further includes a Local Gateway (LGW) that is installed near the base station and is used for reducing delay of a message between the V2X application server and the base station.

3. The UE according to claim 1, wherein the V2X application server sends the message using the unicast based on geography information or the location information of the UE.

4. The UE according to claim 1, wherein the UE communicates with a plurality of V2X application servers.

5. A method of a User Equipment (UE) in a vehicle communication system including a Vehicle to X (V2X) application server and a base station, the method comprising:
storing information that indicates a V2X service executed by the UE;
generating a Fully Qualified Domain Name (FQDN) of the V2X application server;
obtaining IP address of the V2X application server based on Domain Name System (DNS) scheme;
sending the information to the V2X application server according to the IP address via the base station; and
receiving a message related to the V2X service using a unicast via the base station from the V2X application server based on location information of the UE.

6. The method according to claim 5, wherein the vehicle communication system further includes a Local Gateway (LGW) that is installed near the base station and is used for reducing delay of a message between the V2X application server and the base station.

7. The method according to claim 5, wherein the V2X application server send the message using the unicast based on geography information or the location information of the UE.

8. The method according to claim 5, wherein the UE communicates with a plurality of V2X application servers.

9. A User Equipment (UE) comprising:
at least one processor; and
at least one memory coupled to the at least one processor, the at least one memory storing instructions that when executed by the at least one processor cause the at least one processor to:
contain a Fully Qualified Domain Name (FQDN) of a V2X (Vehicle to X) application server,
perform Domain Name System (DNS) to resolve an address of the V2X application server, and
send information to the V2X application server according to the address, the information indicating a V2X service.

10. The UE according to claim 9, wherein the UE communicates with the V2X application server via a base station, the base station being installed near a network node, the network node is used for reducing delay of a message.

11. The UE according to claim 9, wherein the at least one memory stores further instruction that when executed by the at least one processor cause the at least one processor to receive a message related to the V2X service using a unicast via a base station from the V2X application server.

12. The UE according to claim 9, wherein the UE communicates with a plurality of V2X application servers.

13. A method of a User Equipment (UE) comprising:
containing a Fully Qualified Domain Name (FQDN) of a Vehicle to X (V2X) application server;
performing Domain Name System (DNS) to resolve an address of the V2X application server; and
sending information to the V2X application server according to the address, the information indicating a V2X service.

14. The method according to claim 13, wherein the UE communicates with the V2X application server via a base station, the base station being installed near a network node that is used for reducing delay of a message.

15. The method according to claim 13 further comprising:
   receiving a message related to the V2X service using a unicast via a base station from the V2X application server.

16. The method according to claim 13, wherein the UE communicates with a plurality of V2X application servers.

* * * * *